(12) United States Patent
Sun et al.

(10) Patent No.: US 12,313,598 B2
(45) Date of Patent: May 27, 2025

(54) MONITORING LINER WEAR IN INDUSTRIAL MILLS

(71) Applicant: National Research Council of Canada, Ottawa (CA)

(72) Inventors: Zhigang Sun, Greenfield Park (CA); Kuo-Ting Wu, Brossard (CA); Cheng Hu, Richmond (CA); Silvio Elton Krüger, Brossard (CA)

( * ) Notice: Subject to any disclaimer, the term of this patent is extended or adjusted under 35 U.S.C. 154(b) by 346 days.

(21) Appl. No.: 18/008,212

(22) PCT Filed: Jun. 21, 2021

(86) PCT No.: PCT/CA2021/050844
§ 371 (c)(1),
(2) Date: Dec. 5, 2022

(87) PCT Pub. No.: WO2022/000072
PCT Pub. Date: Jan. 6, 2022

(65) Prior Publication Data
US 2023/0236154 A1    Jul. 27, 2023

Related U.S. Application Data

(60) Provisional application No. 63/047,958, filed on Jul. 3, 2020.

(51) Int. Cl.
*B02C 17/18* (2006.01)
*B02C 17/22* (2006.01)
(Continued)

(52) U.S. Cl.
CPC ..... *G01N 29/2437* (2013.01); *B02C 17/1805* (2013.01); *B02C 17/22* (2013.01);
(Continued)

(58) Field of Classification Search
CPC ... B02C 17/1805; B02C 17/22; B02C 17/225; B02C 2210/01
See application file for complete search history.

(56) References Cited

U.S. PATENT DOCUMENTS 4,601,207 A    7/1986   Steblay
7,172,144 B1   2/2007   Slater et al.
(Continued)

FOREIGN PATENT DOCUMENTS

AU    2009223306 B2    9/2013
CA       3075171 A1    3/2019
(Continued)

OTHER PUBLICATIONS

International Search Report and Written Opinion dated Aug. 30, 2021 on PCT/CA2021/050844.
(Continued)

*Primary Examiner* — Bobby Yeonjin Kim
(74) *Attorney, Agent, or Firm* — Brunet & Co. Ltd.; Robert Brunet; Hans Koenig

(57) ABSTRACT

A method of monitoring both liner wear and charge impact in an industrial mill uses a sensor mounted on an elongated element deployed through a shell into a liner of the mill. The elongated element wears at a same rate as the liner under conditions within the shell. Liner wear is related to a reduction in length of the elongated element as measured by travel time of an ultrasound wave, while location and strength of charge impact is related to change in amplitude of vibrations caused by the charge impact. Liner wear measurement can be improved by using shear ultrasound waves instead of conventional longitudinal ultrasound waves. A mill monitoring apparatus has a means for acquiring ultrasonic waves and audible sound waves using the same digitizer; a means for determining the angular position
(Continued)

of the monitoring apparatus; and a means for supplying electric power to the apparatus.

21 Claims, 22 Drawing Sheets

(51) Int. Cl.
    *G01N 29/24*     (2006.01)
    *G01N 29/34*     (2006.01)

(52) U.S. Cl.
    CPC ........ *G01N 29/348* (2013.01); *B02C 2210/01* (2013.01); *G01N 2291/0258* (2013.01); *G01N 2291/02854* (2013.01)

(56) References Cited

U.S. PATENT DOCUMENTS

| | | | |
|---|---|---|---|
| 2011/0037983 | A1 | 2/2011 | Davies |
| 2017/0003208 | A1* | 1/2017 | Steed ...................... B02C 17/22 |
| 2018/0313707 | A1* | 11/2018 | Schumacher ......... F16B 31/025 |
| 2020/0209128 | A1 | 7/2020 | Bustos Robledo et al. |
| 2023/0294104 | A1* | 9/2023 | Melville ................ G01B 17/02 241/33 |

FOREIGN PATENT DOCUMENTS

| | | | | |
|---|---|---|---|---|
| CN | 2615666 Y | 5/2004 | | |
| CN | 2909174 Y | 6/2007 | | |
| JP | S61127804 A | 6/1986 | | |
| JP | 3616620 B2 | 2/2005 | | |
| WO | 2005/083411 A1 | 9/2005 | | |
| WO | WO-2007101319 A1 * | 9/2007 | ......... | B02C 17/1805 |
| WO | 2013/116954 A1 | 8/2013 | | |
| WO | 2019/046984 A1 | 3/2019 | | |
| WO | WO-2019245961 A1 * | 12/2019 | ............. | B02C 17/02 |
| WO | WO-2020132741 A1 * | 7/2020 | ......... | B02C 17/1805 |

OTHER PUBLICATIONS

Birring AS. (1989) Ultrasonic Wear Measurement. Tribiology International. 22(1), 33-37.
Digital Control Labs. (2019). MillSlicer System Components. Internet extract.
Metso. (2019) Grinding down energy consumption in comminution. mining.com: https://www.mining.com/sponsored-content/grinding-downenergy-consumption-in-comminution/.
Outotec MillSense. (2019). Mill charge sensor system. Internet extract.
Royston D. (2007) Semi-autogenous grinding (SAG) mill liner design and development. Mining, Metallurgy & Exploration. 24, 121-132.
Shuen D, et al. (2014). The benefits of using SmartEar™ at Pueblo Viejo. 12th Aus/MM Mill Operators' Conference .
Extended European Search Report dated Mar. 27, 2024 on European application 21834413.3.

* cited by examiner

MONITORING LINER WEAR IN INDUSTRIAL MILLS

CROSS-REFERENCE TO RELATED APPLICATIONS

This application is a national entry of PCT/CA2021/050844 filed Jun. 21, 2021, which claims the benefit of U.S. Provisional Patent Application Ser. No. 63/047,958 filed Jul. 3, 2020, the entire contents of both of which are herein incorporated by reference.

FIELD

This application relates to systems and methods for monitoring liner wear in mills, especially industrial.

BACKGROUND

Mills are important pieces of equipment in comminution. The process of crushing and grinding ore is a highly energy consuming step in the mining industry, and accounts for more than 50% of mine energy consumption, equating to at least 10% of production costs. Comminution also accounts for about 3% of the total amount of electrical energy consumed globally. Improving efficiency in comminution would not only result in higher productivity, but also lead to reductions in energy consumption and in emission of greenhouse gases associated with producing the needed energy.

Liners are widely used to protect mills against wear. The purpose of mill liners is two-fold. First, the liner protects the shell of the mill from abrasion and impact damage caused by the mill charge. Second, the liner must effectively lift the charge. The charge can be ores to be ground (for example in the case of autogenous grinding mills) but may also include grinding media (for example balls in the case of semi-autogenous grinding mills). Monitoring mill liner condition is important for extending equipment life, scheduling liner change-outs, and for optimizing mill operation conditions according to wear degree of liners. Currently, inspection of mill liners requires mill shutdown and is usually performed every few weeks. Since wear rate may vary significantly due to variations in liner quality, properties of materials to be handled and how they are handled, a scheduled liner schedule may have happened too early or too late, resulting in unnecessary production or material losses. The scheduling approach does not provide real-time wear information for continuous optimization of production conditions or for prevention of unplanned shutdown of production caused by unexpected liner failure. Improvement of mill efficiency could be achieved through real-time monitoring of mill liner wear.

Improvement of mill efficiency could also be achieved through monitoring of extent and location of charge impact. For maximum grinding efficiency and maximum protection of liners, it is desirable that the charge strikes on the toe. The location of charge impact is controlled through control of mill rotation and is also affected by the shapes of liners and feed rates of ores and grinding media.

Therefore, obtaining real-time liner wear and/or charge impact information is desirable to improve mill efficiency, and the benefits of obtaining both in real-time could far exceed only obtaining one or the other, especially when combined with power draw measurement, load cell mass measurement and Discrete Element Method (DEM) charge motion prediction for optimization of processing conditions (charge feed, media feed, mill speed) on a continuous basis.

Various configurations of electrical loops embedded in a liner bolt have been proposed for liner wear measurement. For example, (U.S. Pat. No. 7,172,144B1, 2007) in which an instrumented liner bolt was assumed to wear at a same rate as the liner therefore the measured wear on the instrumented bolt was used as an indicator of liner wear.

Ultrasonic methods have been proposed to measure wear on a liner. For example, a plug instrumented with an ultrasound transducer has been proposed (Japan Patent No. JP S61127804 (A), 1984), the instrumented plug mounted flush relative to the inside face of the liner. As the plug wears at the same rate as the liner, the ultrasonic wear measurement taken on the plug provides a measure of wear on the liner. A similar idea was proposed later for wear measurement on a mill liner by using an ultrasonically instrumented bolt inserted into the liner of the mill (PCT patent publication WO 2019046984A1, 2019). WO 2019046984A1 uses an ultrasound transducer mounted at the threaded end of the bolt to send a longitudinal ultrasonic wave through the bolt. The length of the bolt is determined by measuring the round-trip travel time of the ultrasonic wave from the transducer to the distal end of the bolt. The bolt is expected to wear at the same rate as the surrounding liner. Therefore, by measuring reduction in bolt length, the wear on the surrounding liner may be determined.

While the afore-mentioned methods may work when the wear face is perpendicular to the longitudinal direction of the rod, their wear measurement accuracy could be seriously compromised if the wear face becomes oblique to this direction, which is highly likely during the life time of a liner in SAG mills. Furthermore, these disclosures did not deal with situations where ultrasonic waves reverberate and mode-converted at the side wall of the rod, making ultrasonic waves reflected off the rod end unresolvable.

Several commercial products are available for monitoring of charge impact. For example, a shell-mounted vibration sensing system to provide 360-degree real-time ball impact polar plot (Digital Control Lab, 2019), a wireless sensor attached to a liner bolt to measure the mill's toe angle (OUTOTEC MILLSENSE® MILL CHARGE SENSOR SYSTEM, 2019), and a microphone system to capture sound generated by charge impact on liners and provide estimation of the number of steel-on-steel impacts per unit time to ensure that the charge is striking on the toe.

There remains a need for improved methods of obtaining liner wear and/or charge impact information in real-time in industrial mills.

SUMMARY

A method of monitoring both liner wear and charge impact in a mill comprises: deploying a sensing probe through an opening in a shell of a mill into a liner of the shell, the sensing probe comprising a sensor and an elongated element having a proximal end and a distal end, the sensor mounted on the proximal end of the elongated element outside the shell, the distal end of the elongated element situated inside the liner inside the shell so that the distal end of the elongated element is impacted by charge during operation of the mill, the elongated element wearing at a same rate as the liner under conditions within the shell, the sensor capable of detecting impact of the charge on the elongated element during operation of the mill; using the sensor to determine whether the elongated element has decreased in length since a previous length determination and relating a decrease in the length of the elongated element to liner wear; and, using the sensor to determine variations in charge impact on the elongated element over time and relating the variations in charge impact over time to a force of impact events in the mill and/or a location of the charge in the mill.

A method of monitoring liner wear in a mill, the method comprising: propagating shear ultrasound waves to a distal end of an elongated element deployed through an opening in a shell of a mill into a liner of the shell so that the distal end of the elongated element is impacted by charge during operation of the mill, the elongated element wearing at a same rate as the liner under conditions within the shell; determining travel time of the shear ultrasound waves to the distal end; determining whether the travel time has decreased since a previous travel time determination; determining a decrease in length of the elongated element from a decrease in the travel time of the ultrasound waves to the distal end; and, relating the decrease in the length of the elongated element to liner wear.

A method of monitoring liner wear in a mill comprising: providing acoustic markers on a liner bolt that affixes a liner to a shell of the mill, the liner bolt having a distal end that is impacted by charge during operation of the mill and wears at a same rate as the liner under conditions within the shell; propagating shear, longitudinal or another type of ultrasound waves in the liner bolt; tracking echo signals reflected off an extreme end of a wear face of the liner bolt at the distal end of the liner bolt and off a current distalmost acoustic marker; determining travel time of the ultrasound waves to the extreme end of the wear face, and determining a decrease in travel time to the extreme end of the wear face in comparison to a previous travel time determination of the ultrasound waves to the extreme end of the wear face; determining a decrease in length of the liner bolt from the decrease in the travel time of the ultrasound waves to the extreme end of the wear face; and, relating the decrease in the length of the liner bolt to liner wear by determining when a waveform of the echo signal reflected off the current distalmost acoustic marker starts to change due to a change in shape of the current distalmost acoustic marker caused by wear of the liner bolt, determining travel time of the ultrasound waves to the current distalmost acoustic marker, determining distances from a proximal end of the liner bolt to the extreme end of the wear face and to the current distalmost acoustic marker, determining liner wear profile from a difference between the distance from the proximal end of the liner bolt to the extreme end of the wear face and the distance from the proximal end of the liner bolt to the current distalmost acoustic marker, estimating actual liner wear profile from the determined liner wear profile until a next distalmost acoustic marker is reached due to wear of the liner bolt, updating liner wear profile information each time the liner bolt wears down to one of the acoustic markers as indicated by a change to the waveform of the echo signal.

An apparatus for monitoring tumbling mill condition and tumbling mill operation condition comprises: means for acquiring ultrasonic waves for rod wear measurement and audible sound waves for detection and measurement of charge impact with a same data acquisition device; means for measuring angular position of the tumbling mill at each moment impact data is being recorded; means for conducting the wear and impact measurements at a plurality of locations; and, means for supplying electric power to the apparatus.

The systems and methods described herein permit real-time monitoring of liner wear and/or charge impact in mills, for example grinding or tumbling mills. The systems and methods are especially useful in industrial mills, for example mills used in the mining industry to break down ores. Mills for the mining industry may be autogenous or semi-autogenous.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

Figure 1:
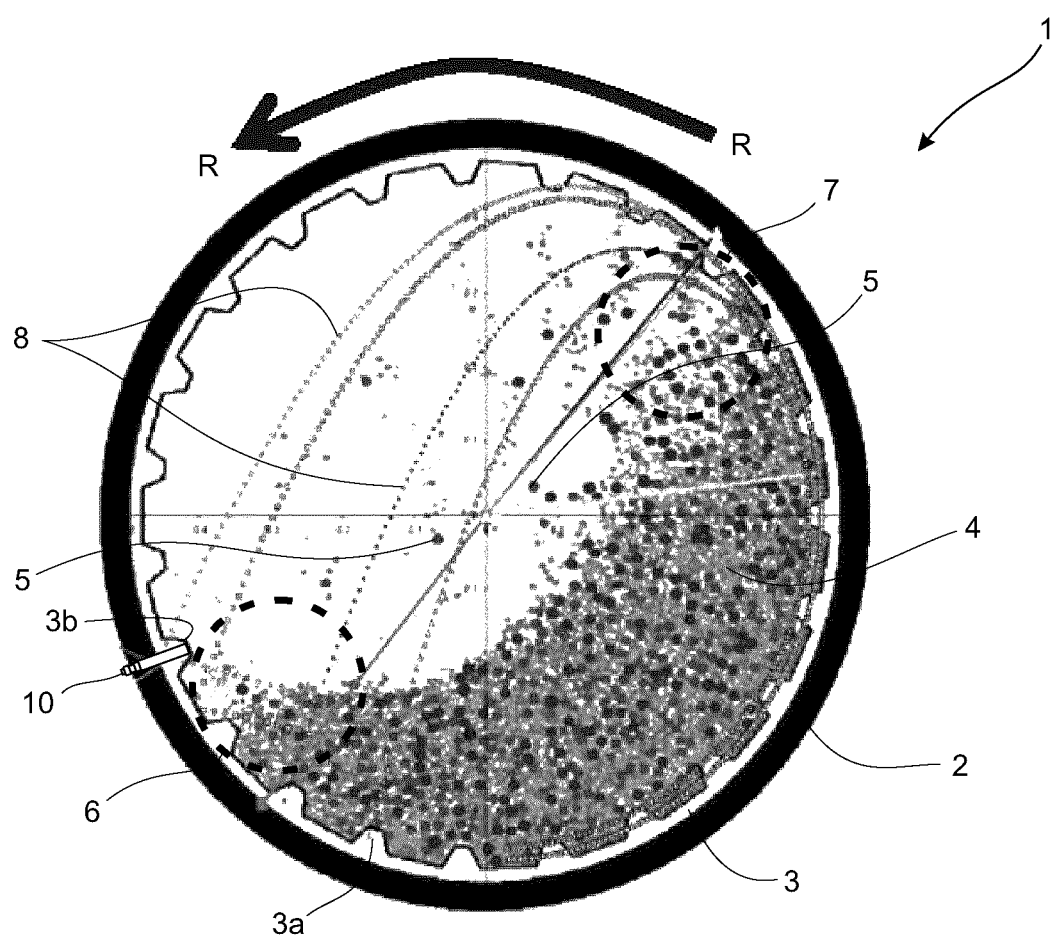
FIG. 1 depicts a schematic diagram depicting a cross-section of a semi-autogenous grinding (SAG) mill in operation.

The method of monitoring both liner wear and charge impact in a mill involves using a system comprising a sensor, preferably a single sensor, for monitoring both the liner wear and charge impact in the mill. Being able to use a single sensor to monitor both liner wear and charge impact simplifies data collection, simplifies implementation of the monitoring system in existing mills, reduces maintenance of the monitoring system and provides data on both liner wear and charge impact at the same location on the shell not only resulting in better correlation of liner wear and charge impact information but most importantly allowing for a much higher level of optimization of the milling process than if only wear or impact information is available. The system comprises a sensing probe deployed through an opening in a rotating shell of the mill, the sensing probe comprising an elongated element extending into a liner of the shell so that a distal end of the elongated element is impacted by charge during operation of the mill. When the sensing probe is first installed, or when liner wear is being measured, the distal end of the elongated element is preferably flush with an inner surface of the liner, although the elongated element may stop short of the inner surface of the liner until the liner wears down to the elongated element. The inner surface of the liner is the surface of the liner exposed to an interior volume of the shell into which a material to be comminuted is charged. The elongated element comprises a material that wears at a same rate as the liner under conditions within the shell. Therefore, a length of the elongated element can be used as an indication of wear, and the rate at which the elongated element shortens can be used as an indication of wear rate. The liner and the elongated element may comprise the same or different materials provided the materials wear at substantially the same rate. Preferably, the liner and the elongated element are comprised of the same material. The liner and the elongated element preferably comprise a metal or metal alloy, for example a steel, iron and the like. The elongated element may be a bar, bolt (e.g., a liner bolt), rod or other high-aspect ratio structure. A liner bolt is particularly preferred because an existing liner bolt can be retrofitted with a sensor to form the sensing probe. The elongated element may have any suitable cross-sectional shape, for example circular, elliptical, triangular, tetragonal (e.g., square, rectangular), pentagonal, hexagonal, a shape with both curved and straight sides, etc.).

The sensing probe comprises a sensor mount on a proximal end of the elongated element outside the shell. Thus, the elongated element extends out of both ends of the aperture in shell. The sensor is capable of detecting impact of a charge in the mill on the elongated element during operation of the mill. When the charge impacts the elongated element, vibrations are generated in the elongated element and the sensor should be capable of sensing these vibrations as they propagate through the elongated element. Preferably, the sensor is a vibration sensor or an ultrasound sensor. The sensor is acoustically coupled to the elongated element with help of either an acoustic couplant or an adhesive. For measurement of wear on the elongated element, the sensor may be operated in an active mode whereby an electric pulse is applied to the sensor to generate ultrasonic waves that propagate from the sensor to the distal end of the elongated element. Then the sensor is switched to a reception mode to capture ultrasonic waves bounced back from the inside of the elongated element. An electronic unit is utilized for providing the electrical pulse as well as conditioning, digitization and recording of the returned ultrasonic waves. For measurement of impact on the elongated element, the sensor may be operated in a passive mode whereby no electrical pulse is applied to the sensor and the sensor captures vibrations and acoustic waves in the elongated element caused by a charge impact to the elongated element. The same electronic unit is utilized for conditioning, digitization and recording of the vibrations and acoustic waves captured by the sensor. The sensor is preferably a piezoelectric transducer and is designed is such a way that, when excited with an electric pulse, it generates acoustic waves of much higher frequencies than frequencies of vibrations and acoustic waves caused by an impact on the elongated element. This feature allows wear on the elongated element to be measured in the presence of impact by removing the effect of impacts on captured ultrasonic signal through the use of a high-pass filter.

To monitor liner wear in the mill, the sensor may be used to periodically or continuously according to wear status. A decrease in length of the elongated element is related to the extent of liner wear. Once the length of the elongated element drops to a threshold value, the liner needs to be replaced.

The way in which the length of the elongated element is determined depends on the type of sensor.

A vibration sensor is a passive sensor that detects vibrations. During the operation of the mill, the vibration sensor detects at least one structural resonant frequency of the elongated element caused by impact of charge on the elongated element in the mill. The vibration sensor determines from the at least one structural resonant frequency whether the at least one structural resonant frequency has increased since a previous structural resonant frequency determination. Because the frequency of at least one of the structural resonances increases in a known relationship that is a function of the type of material of which the elongated element is made as the elongated element becomes shorter, the decrease in the length of the elongated element can be calculated from the increase in the frequency of the at least one structural resonance. The elongated element is expected to wear at the same rate as the surrounding liner, therefore liner wear can be estimated from the reduction of elongated element length.

An ultrasound sensor suitable for monitoring liner wear may comprise an ultrasound transducer or a plurality of ultrasound transducers, which can be operated in an active mode. When the ultrasound sensor comprises a plurality of ultrasound transducers, each of the transducers may be operated independently or may be electrically interconnected to operate together. When operated independently, the plurality of ultrasound transducers is part of a multi-channel ultrasound system, whereas electrically interconnecting the ultrasound transducers permits the use of a single-channel ultrasound system. The ultrasound transducer or transducers may emit longitudinal ultrasound waves, shear ultrasound waves or both. In a preferred embodiment, the ultrasound transducer or transducers emit shear ultrasound waves or both shear and longitudinal ultrasound waves. In the active mode, during or not during operation of the mill, an ultrasound wave is propagated by the transducer or plurality of transducers to the distal end of the elongated element. Round-trip travel time of the ultrasound wave to the distal end and back to the ultrasound sensor is determined and compared to the travel time of the ultrasound wave in a previous travel time determination. If the travel time has decreased since the previous travel time determination, the elongated element has become shorter. The decrease in the length of the elongated element is calculated from a decrease in the travel time of the ultrasound wave to the distal end using a known relationship that is a function of the type of material of which the elongated element is made, and in some cases the temperature of the material. The elongated element is expected to wear at the same rate as the surrounding liner, therefore the liner wear can be estimated from the reduction of elongated element length.

An ultrasound sensor can also be used to monitor charge impact in the mill during operation of the mill. In doing so, the ultrasound sensor is operated in passive mode in the same manner as a vibration sensor. Monitoring charge impact involves determining variations in charge impact on the elongated element over time. The variations in charge impact over time may be related to force (strength) of the impacts and/or a number of impact events per unit time, which can be used to determine a location of the charge in the mill. Monitoring charge impact is done during operation of the mill. A vibration sensor continuously detects vibrations of the elongated element caused by the impact of charge on the elongated element in the mill, and determines the variations in charge impact on the elongated element over time from variations in amplitude of the vibrations over time. An ultrasound sensor can be operated in passive mode and used to monitor charge impact in the same manner as a vibration sensor. The charge impact is preferably monitored on a continuous basis. By monitoring charge impact continuously, 360-degree real-time charge impact polar plots for the mill can be obtained, which can be used to locate the charge in the mill.

Data collected by the sensor is either processed locally by a microcontroller or a microprocessor in an ultrasonic data acquisition unit, or transmitted to a remote computer for determination of liner wear and charge impact information. The information is then sent to a control center of the mill for continuous optimization of production through adjustment of grinding media feed, charge feed, water feed and rotation speed.

In some embodiments, acoustic insulation is provided between the elongated element and the shell, between the elongated element and the liner, or between the elongated element and both the shell and the liner. In some embodiments, a tube is deployed through the opening in the shell into the liner, and the elongated element is disposed in the tube to separate at least a portion of the elongated element from the liner. The acoustic insulation reduces propagation of vibrations from the surrounding liner and/or the shell to the elongated element. Likewise, separating the elongated element from the liner with a tube reduces propagation of vibrations from the surrounding liner.

The shell of the mill bounds the volume in which the material to be comminuted is charged along with any desired grinding medium or media. The material to be charged into the mill is preferably an ore, and the grinding medium should be harder than the ore particles to resist being comminuted by ore particles while assisting with comminution of the ore particles. The shell is preferably rotatable about a horizontal so that while the shell rotates, the ore charge together with the grinding medium are mixed together by a rolling action causing the ore particles to be abraded by contact with other ore particles, and with grinding medium if grinding medium is being used. The shell is preferably cylindrical in shape, although the shell could have a different shape. The shell is also typically made of metal, for example steel, iron or the like.

In the apparatus for monitoring tumbling mill condition and tumbling mill operation condition, the means for measuring angular position of the tumbling mill at each moment impact data is being recorded preferably comprises a 3-axis accelerometer capable of measuring both dynamic acceleration resulting from motion or shock and static acceleration, such as gravity. The means for conducting the wear and impact measurements at a plurality of locations preferably applies to a plurality of locations in a same cross-section for improved sensitivity and also for early detection of unbalanced load or uneven wear in the circumferential direction. Preferably, the means for conducting the wear and impact measurements at a plurality of locations applies to a plurality of cross-sections in a flow direction of ore. Preferably, the means for measuring angular position of the tumbling mill is used for monitoring rotation speed of the mill vs angular position of the monitoring apparatus as an indicator of mill operation and health condition. Preferably, the means for supplying electric power to the apparatus comprises solar cells, more preferably artificial lights and solar cells. Preferably, the means for supplying electric power to the apparatus is turned on when mill monitoring is needed and off after mill monitoring period is over.

Referring to FIG. 1 (adapted from Royston D. (2007) *Mining, Metallurgy & Exploration.* 24, 121-132), one embodiment of a semi-autogenous grinding (SAG) mill 1 comprises a cylindrical steel shell 2 lined with a steel liner 3 on an inner surface of the shell 2. The liner 3 comprises lifting protrusion 3a (only one labeled) extending inwardly into the shell 2 to lift an ore charge as the shell 2 rotates, the ore charge comprising ore particles 4 and grinding media 5 (e.g., steel balls, only two labeled) mixed with the ore particles 4. The shell 2 is shown having a counter-clockwise rotation direction R-R, the bulk of the charge forming a toe 6 closer to a bottom of the rotating shell 2 and a shoulder 7 closer to a top of the rotating shell 2 substantially diametrically opposed to the toe 6. As the shell 2 rotates, the ore particles 4 and the grinding media 5 from the shoulder 7 fall down to the toe 6 along various charge trajectories 8 (only two labeled). Constant motion between the ore particles 4 in contact with each other, and between the ore particles 4 in contact with the grinding media 5, causes comminution of the ore particles 4 into smaller sizes. Charge shape (toe 6 and shoulder 7) depends on rotation speed of the shell 2, profile of the liner 3 (e.g., size, shape and separation of the lifting protrusions 3a), characteristics of the ore 4, charge volume and filling fraction of the charge in the shell 2. A single liner wear and charge impact sensing probe 10 is inserted through an aperture in the shell 2 at one location so that the end of the probe 10 is initially flush with or lower than the inner surface 3b of the liner 3.

As the shell 2 rotates, the sensing probe 10 moves with the shell 2 thereby continuously changing angular location with respect to the ore charge. As the sensing probe 10 moves through the ore charge from the toe 6 to the shoulder 7, the sensing probe 10 experiences a larger number of impact events than experienced while the sensing probe 10 moves between the shoulder 7 and the toe 6. The sensing probe 10 detects the change in the number of impact events throughout each cycle of the shell 2, and knowing the location of the sensing probe 10 at the transitions between many and few charge impacts allows delineation of the location of the toe 6 and shoulder 7 of the ore charge in the shell 2. The sensing probe 10 also detects the force (strength) of impact of the ore charge against the liner 3. Further, the sensing probe 10 is used for periodic or constant monitoring of liner wear. With the liner 3 moving relative to the ore charge, the ore charge abrades the liner wearing down the liner. The sensing probe 10 can determine the rate of wear. Based on real-time wear and charge impact information (e.g., strength and location of the charge), continuous optimization of production is allowed through adjustment of grinding media feed (e.g., grinding ball feed), charge feed and rotation speed according degree of liner wear and ore quality.

Figure 4:
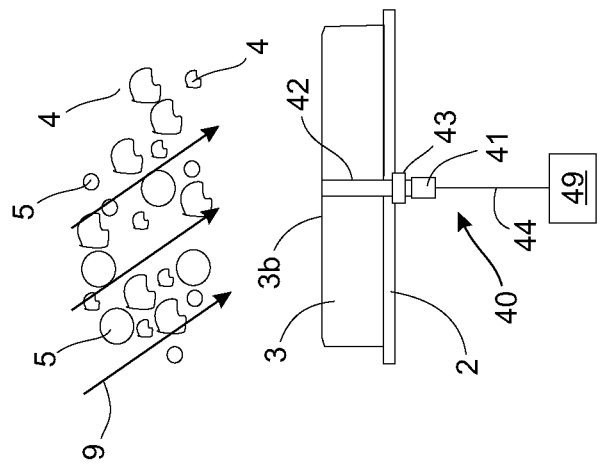
FIG. 4 depicts a schematic diagram of a monitoring system using a single ultrasound sensor to monitor liner wear and charge impact in the mill of FIG. 1.
Figure 3:
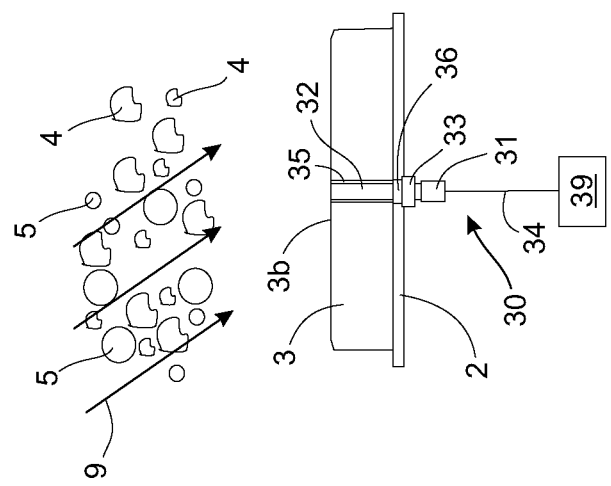
FIG. 3 depicts a schematic diagram of another monitoring system using a single vibration sensor to monitor liner wear and charge impact in the mill of FIG. 1.
Figure 2:
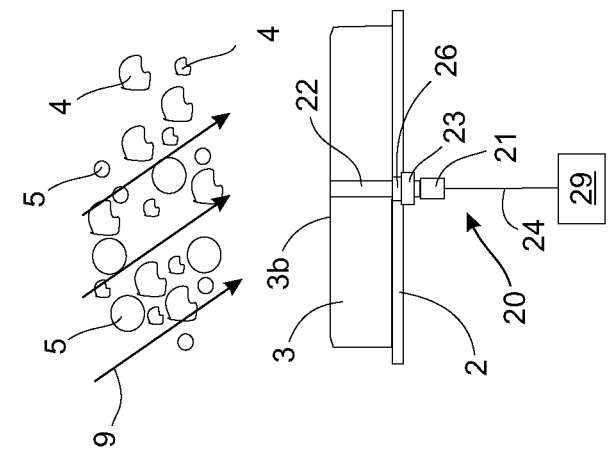
FIG. 2 depicts a schematic diagram of a monitoring system using a single vibration sensor to monitor liner wear and charge impact in the mill of FIG. 1.

Three variations of the sensing probe 10 are depicted in FIG. 2, FIG. 3 and FIG. 4, which depict three examples of liner wear and charge impact monitoring systems 20, 30, 40, respectively.

Referring to FIG. 2, in one embodiment a monitoring system 20 comprises a single vibration sensor 21 to monitor liner wear and charge impact in the mill of FIG. 1 while the mill is operating. The system 20 comprises an elongated member 22 (e.g., a liner bolt) that extends through a through-aperture in the shell 2 of the mill so that a proximal end of the elongated member 22 is outside the shell 2 and a distal end of the elongated member 22 is initially flush with an inner surface 3b of the liner 3. The elongated member 22 is secured in the through-aperture by a threaded fitting adapter 23 that is threaded on to corresponding threads in the through-aperture. If the through-aperture is not threaded, the fitting adapter 23 may simply be a nut. The vibration sensor 21 is mounted on the elongated member 22 proximate the proximal end of the elongated member 22 outside the shell 2. The vibration sensor 21 is electronically wired through a cable 24 to a mill monitoring apparatus 29 so that vibration data collected by the vibration sensor 21 can be recorded and processed locally or transmitted to a remote computer for processing to determine liner wear and charge impact information from the vibration data. Liner wear and charge impact information is then sent to the controller or control center of the mill for continuous optimization of production through adjustment of grinding media feed, charge feed, and rotation speed.

The vibration sensor 21 is acoustically isolated from the shell 2 with an acoustic insulation fixture 26 inserted in the through-aperture between the shell 2 and the elongated member 22 in order to reduce interference from vibrations in the shell 2. An ore charge comprising the ore particle 4 and the grinding media 5 impacts the liner 3 along an impact direction 9 thereby abrading the line 3 and the distal end of the elongated member 22. Because the line 3 and the elongated member 22 wear at the same rate, a reduction in the length of the elongated member 22, as calculated from increasing frequency of one of the structural resonances caused by the charge impacting on the elongated member 22 and as detected by the vibration sensor 21, is a measure of the wear and wear rate of the liner 3. Further, as described above, the amplitude of the vibrations in the elongated member 22 caused by the charge impacting on the elongated member 22 and as detected by the vibration sensor 21, is a measure of the force of the charge impacts; and, the change in amplitude of the vibrations over time during a rotational cycle of the shell 2 indicates a change in the number of impacts over time, which provides an indication of the location of the charge, specifically the toe 6 and shoulder 7 of the charge, in the shell 2.

Referring to FIG. 3, in another embodiment a monitoring system 30 comprises a single vibration sensor 31 to monitor liner wear and charge impact in the mill of FIG. 1 while the mill is operating. As with the system 20 of FIG. 2, the system 30 comprises an elongated member 32 (e.g., a liner bolt) on which the vibration sensor 31 is mounted, a threaded fitting adapter 33 to secure the elongated member 32 in the through-aperture of the shell 2 and a mill monitoring apparatus 39 electronically connected to the vibration sensor 31 by a cable 34. The system 30 operates identically to the system 20 of FIG. 2 except that the system 30 also comprises a hollow tube 35 inserted through the liner 3 in which the elongated member 32 is housed. The hollow tube 35 separates the elongated member 32 from the liner 3 to acoustically insulate the elongated member 32 from vibrations in the liner 3. There is a gap between the hollow tube 35 and the elongated member 32 to facilitate separation. The hollow tube 35 comprises a material that wears at the same rate as the liner 3 and the elongated member 32. For example, the hollow tube 35 can be made of steel, specifically the same kind of steel as the elongated member 32.

Referring to FIG. 4, in yet another embodiment a monitoring system 40 comprises a single ultrasound sensor 41 to monitor liner wear and charge impact in the mill. Similar to the system 20 of FIG. 2, the system 40 comprises an elongated member 42 (e.g., a liner bolt) on which the ultrasound sensor 41 is mounted, a threaded fitting adapter 43 to secure the elongated member 42 in the through-aperture of the shell 2 and a mill monitoring apparatus 49 electronically connected to the ultrasound sensor 41 by a cable 44. The ultrasound sensor 41 is capable of being operated in a passive mode and an active mode. In the passive mode, the ultrasound sensor 41 operates similarly to the vibrations sensors 21, 31 of the systems 20, 30 of FIG. 2 and FIG. 3, respectively. Thus, in the passive mode, during operation of the mill, the ultrasound sensor 41 detects amplitude of the vibrations in the elongated member 42 caused by the charge impacting on the elongated member 42, which is a measure of the force of the charge impacts; and, detects the change in amplitude of the vibrations over time during a rotational cycle of the shell 2, which is an indication in a change in the number of impacts over time, thereby providing an indication of the location of the charge in the shell 2, specifically the location of the toe 6 and shoulder 7 of the charge in the shell 2. In the active mode, the ultrasound sensor 41, which comprises an ultrasound transducer, emits an ultrasound wave in the elongated member 42, which travels to the distal end of the elongated member 42 and back to the ultrasound sensor 41 where the arrival of the ultrasound wave is detected and the round-trip travel time determined. As the length of the elongated member 42 shortens, the round-trip travel time shortens, so by comparing the round-trip travel time to a previous round-trip travel time for the ultrasound wave, a reduction in the travel time is used to determine the wear and rate of wear of the elongated member 42, which is directly related to the wear and rate of wear of the liner 3. In a manner similar to the operation of the system 20 described above, the mill monitoring apparatus 49 records and processes collected signals, or transmits the collected data to a remote computer for processing to determine liner wear and charge impact information from the ultrasonic data and vibration data. Liner wear and charge impact information is then sent to the controller or control center of the mill, either from the mill monitoring apparatus or from the remote computer, for continuous optimization of production through adjustment of grinding media feed, charge feed, and rotation speed.

In an operating mill, wear at the distal end of the elongated element of the monitoring system is often uneven. While the distal end is flat when the monitoring system is first installed, wear at the distal end of the elongated element can result in a variety of different wear profiles depending on how and where the charge impacts and abrades the elongated element. While a longitudinal ultrasound wave based wear sensing method may work when the wear face is perpendicular to the longitudinal direction of the elongated element, such a sensing method may quickly lose its capability to measure wear accurately if the wear face becomes oblique to the direction of the ultrasound wave because the reflected wave from the distal end of the elongated element will be partially redirected to an outer wall of the elongated element and then reverberate and be mode-converted at the wall to other types of waves, resulting in the echo signal reflected off the distal end of the elongated element being unsolvable for length measurement of the elongated element. To overcome this difficulty, shear ultrasound waves may be used. The use of shear ultrasound waves significantly reduces mode-conversion and reverberation of unwanted reflected waves at the outer wall of the elongated element and provides a capability to measure wear on the distal end of the elongated element in a continuous manner even when the wear profile is not uniform. In practice, the sensor for transmitting and receiving shear ultrasound waves can be a thin-film piezoelectric shear wave transducer with operation frequencies in a range of 1 to 10 MHz.

In an embodiment of a method of monitoring liner wear in a mill, a shear ultrasound wave is propagated to a distal end of the elongated element, which, as described above, is deployed through an opening in the shell of the mill into the liner of the shell so that the distal end of the elongated element is impacted by charge during operation of the mill. Also as described above, the elongated element comprises a material that wears at a same rate as the liner under conditions within the shell. The travel time of the shear ultrasound wave to the distal end is determined, and then whether the travel time has decreased since a previous travel time determination is also determined. A decrease in length of the elongated element is determined from a decrease in the travel time of the ultrasound wave to the distal end, and the decrease in the length of the elongated element is related to liner wear.

Figures 5A, 5B, 5C:
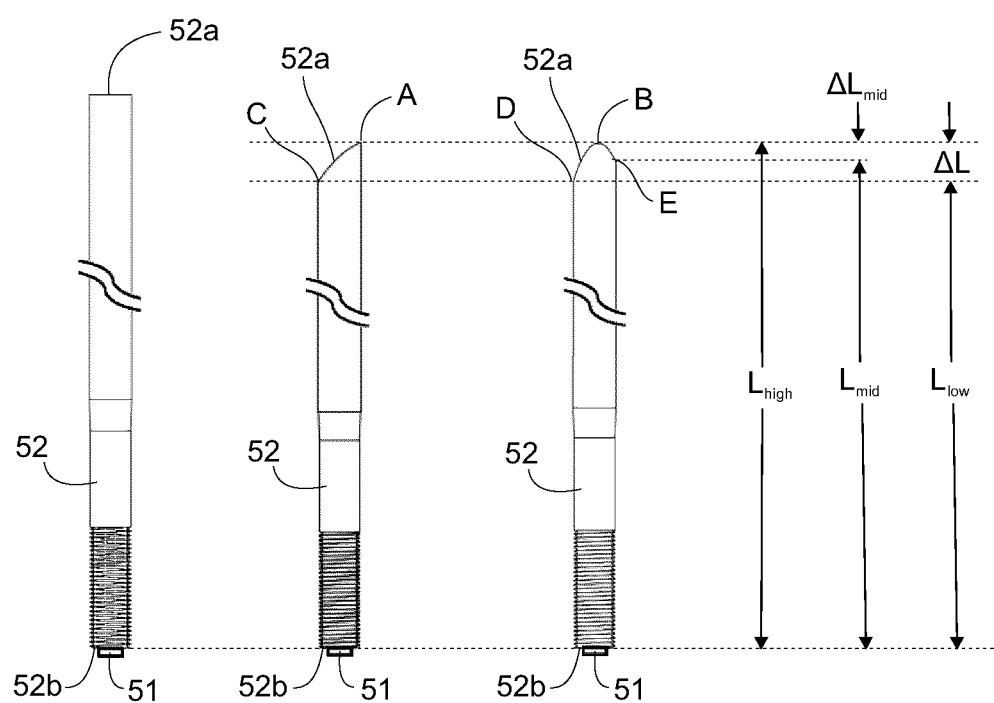
FIG. 5A, FIG. 5B and FIG. 5C depict schematic diagrams of an instrumented steel liner bolt showing different tip shapes as a result of wear in a mill.

With reference to FIG. 5A, FIG. 5B and FIG. 5C, an instrumented steel liner bolt having different tip shapes as a result of wear in a mill are shown. The instrumented bolt comprises an elongated body 52 having a distal end 52a (i.e., the tip) inserted through the shell into the liner of the mill, and a proximal end 52b located outside the shell of the mill. A wear and impact sensor comprising a shear wave ultrasound transducer 51 is mounted on the proximal end 52b of the instrumented bolt 52. Before wear begins, the distal end 52a of the instrumented bolt 52 is flat (FIG. 5A), which should be flush with the inner surface of the liner when the sensing probe is installed or when liner wear is being measured. Over time, and depending on liner design and location of the bolt 52, the bolt 52 will wear at the same rate as the surrounding liner and the tip may take a different shape (i.e., wear profile) than being flat (FIG. 5B and FIG. 5C). In FIG. 5B the distal end is oblique, while in FIG. 5C the distal end is rounded. To measure wear properly, it is desirable to measure the longest distance (bolt length) $L_{high}$ and the shortest distance $L_{low}$ between the proximal end 52b and the distal end 52a of the bolt 52 (FIG. 5B), or the distances $L_{low}$, $L_{mid}$, and $L_{high}$ between the proximal end 52b and the lower edge C, upper edge E, and the extreme end B of the wear face (FIG. 5C). When combined with liner wear simulation, the values of $L_{low}$, $L_{mid}$, and $L_{high}$ would allow an operator to better understand wear degree and behavior of the liner near the bolt 52 than if only one of these distances is available.

Figure 6A:
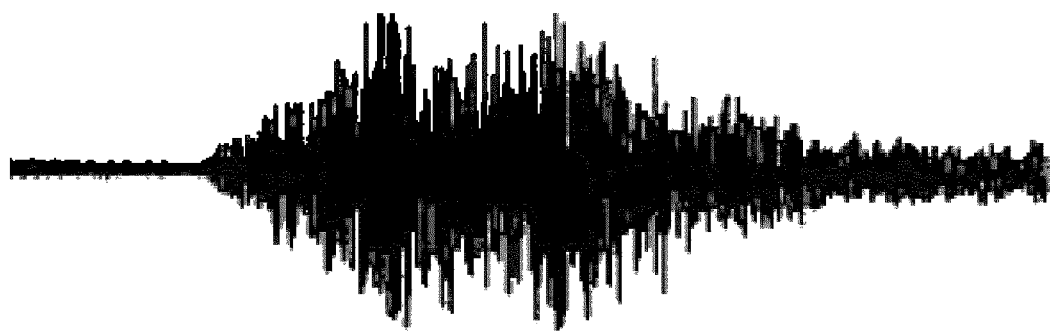
FIG. 6A depicts an ultrasound echo signal obtained using a conventional longitudinal wave ultrasound transducer on a steel liner bolt with a tip beveled 30° due to wear.
Figure 6B:
FIG. 6B depicts an ultrasound echo signal obtained using a shear wave ultrasound transducer on the same line bolt as in FIG. 6A with a tip beveled 30° due to wear.
Figure 6C:
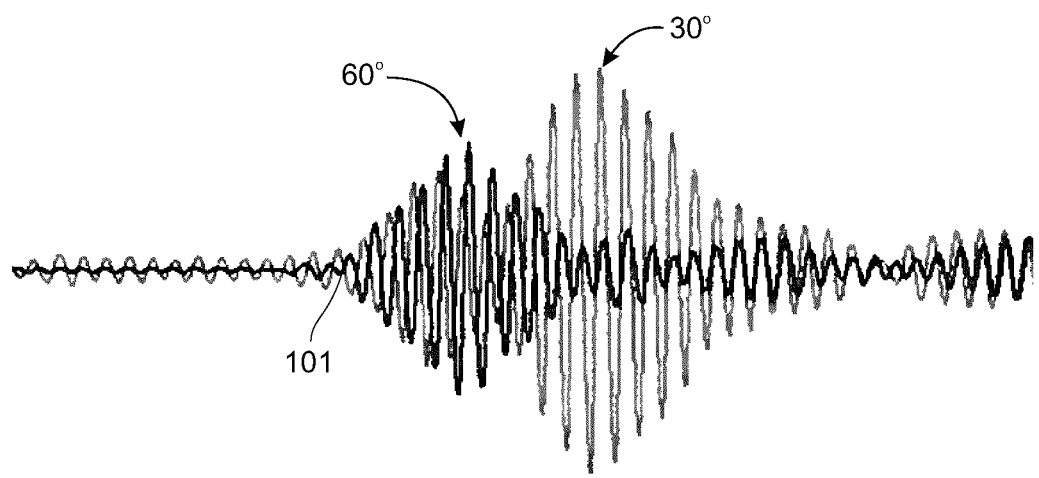
FIG. 6C depicts a comparison of echo signals reflected off tips having 30° and 60° tip angles on two steel liner bolts of the same length and diameter as in FIG. 6A.

Instead of using a conventional longitudinal wave ultrasound transducer, the shear wave ultrasound transducer 51 is used to measure $L_{high}$. An echo signal obtained for the instrumented bolt 52 of FIG. 5A with the shear wave ultrasound transducer 51 is shown in FIG. 6B. The echo signal is well resolved and is of much higher quality than an echo signal obtained for the instrumented bolt 52 of FIG. 5A using a longitudinal wave ultrasound transducer, which is shown in FIG. 6A. It is clear that the shear wave ultrasound transducer can provide for more accurate length measurement than the longitudinal wave ultrasound transducer. However, the waveform of the echo signal can change when bolt length or wear profile at the distal end 52a of the bolt 52 changes. An example of waveform change caused by a change in wear profile is shown in FIG. 6C. The waveform of the echo signal in the bolt 52 in FIG. 5B with an oblique wear face beveled at an angle of 30° with respect to a lateral axis of the elongated member is indicated as 30° in FIG. 6C, while the waveform in an identical bolt except with an oblique wear face beveled at an angle of 60° is indicated as 60° in FIG. 6C. A comparison of the two waveforms shows that the arrival time of the strongest peak (highest amplitude) of the echo signal would not provide the most accurate measurement of the bolt length $L_{high}$. Instead, earliest arrival 101 of the echo signal from the tip provides a better measurement of $L_{high}$ as the earliest arrival time 101 is substantially the same in both cases.

With reference to FIG. 5B and FIG. 5C, depending on wear profile, bolt length and ultrasound transducer frequency, when are available all echoes from the extreme end of the wear face of the bolt 52, which is point A on the bolt 52 of FIG. 5B and point B on the bolt 52 of FIG. 5C, and from respective lower edge C (FIG. 5B) and lower and upper edges D and E (FIG. 5C) of the wear face of the bolt 52, ultrasound travel times whereby the distances from the proximal end 52b of the bolt to the extreme end and lower and upper edges of the wear face of the distal end 52a of the bolt are determined. Then the wear profile is determined as the differences among the above-measured distances. In practice it can happen that the received echo signal is predominantly reflected off the extreme end of the wear face of bolt 52, but not from lower and upper edges of the wear face, making measurement of $L_{low}$ and $L_{min}$ difficult. Also, the velocity (or time of flight) of shear ultrasonic waves propagating inside a bolt are sensitive to temperature. Without correcting the effect of temperature on the time of flight, a 10° C. temperature variation would result in a length measurement error of 0.15 mm for every 100 mm increase of bolt length. This error may add up to other measurement errors to render the accuracy of the final wear measurement less acceptable.

To address a lack of ultrasound wave reflection from lower edge(s) of the wear face of an elongated element, one or more acoustic reference markers (e.g., notches, shallow holes, through holes and the like) may be inscribed longitudinally spaced apart along one or more sides of the elongated element. Holes are preferably oriented transversely in the elongated element. Each of the one or more acoustic reference markers act as reflectors for ultrasound waves directed to the sides of the elongated element. The echo signal from each of the acoustic reference markers as well as from the extreme end of the tip will appear as peaks in the waveform of the reflected ultrasound waves. The echo signal for a given notch will change in waveform when the acoustic reference marker is reached by the advancing wear face and disappear from the waveform as the elongated element wears past the given acoustic reference marker. The separation in the waveform between the echo signal associated with the extreme end of the tip and the echo signal associated with the acoustic reference marker being reached by the wear face provides a measure of the difference in length of the elongated element between the extreme end of the tip and the lower edge of the tip, thereby providing a measure of the shortest distance between the proximal end and the distal end of the elongated element. When the waveform of the echo signal reflected off the current distal-most acoustic reference marker starts to change due to a change to the shape of the acoustic reference marker by the advancing wear face, travel times of the ultrasound waves from the proximal end of the elongated element to the extreme end of the wear face and to the acoustic reference marker being touched by an edge of the wear face are determined. Then by using the determined travel times, the distances from the proximal end of the elongated element to the extreme end of the wear face and to the acoustic reference marker being touched by an edge of the wear face are determined. Then the difference of $L_{high}$ and $L_{low}$ (i.e., $\Delta L$) or of $L_{high}$ and $L_{mid}$ (i.e., $\Delta L_{mid}$), is determined. From this point on and until a next acoustic reference marker is reached by the new advancing wear face, the value of $\Delta L$, and if applicable, the value of $\Delta L_{mid}$, is used as a measure of liner wear profile surrounding the elongated element. The value of $\Delta L$ or of $\Delta L_{mid}$ is updated each time an acoustic reference marker has been detected as just being reached by the wear face, as indicated by a change to the waveform of the echo signal reflected off the acoustic reference marker.

Acoustic reference markers also allow length measurement accuracy to be validated during mill operation when no access to liners is available for manual wear measurement. If the ultrasonic length measurement is reliable, the length reading should be the same as the longitudinal distance of an acoustic reference marker from the ultrasound transducer when the lower edge of the wear face reaches the bottom boundary of the acoustic reference marker or when the extreme end of the wear face passes the bottom boundary of the acoustic reference marker. If a cross-correlation method is used for time-of-flight measurement, notches will be good check points for updating a reference signal. More specifically, the reference signal can be updated whenever the lower edge of the wear face reaches the bottom boundary of an acoustic reference marker or when the extreme end of the wear face passes the bottom boundary of an acoustic reference marker. The number of acoustic reference markers inscribed along the sides of the elongated element depends on the length of the elongated element and a desired frequency at which the values of $\Delta L$ and $\Delta L_{mid}$ are to be updated or the length measurement accuracy is to be validated. Preferably, one of the acoustic reference markers is a lowermost notch that is closest to the proximal end of the elongated element, and which represents a minimum acceptable length of the elongated element. Once the lower edge of the wear face of the elongated element has worn down to the lowest-most acoustic reference marker, the sensing probe will need to be replaced. A good location for an uppermost acoustic reference marker would be where the liner wear profile is expected to have fully developed into a fairly stable shape as the wear face progresses further.

At a given distance along the elongated element, one acoustic reference marker or a number of acoustic reference markers may be inscribed at different perimetrical locations around the elongated element. At installation, the elongated element should be oriented so that the one or more acoustic reference markers are aligned with a future lower edge point of the wear face when the elongated element wears. The future lower edge point can usually be predicted from a general trend of liner wear observed in the mill. If the elongated element is expected to wear on opposed sides of the elongated element to form a rounded tip, acoustic reference markers may be inscribed in opposite sides at a given longitudinal location along the elongated element. A perimetrical acoustic reference marker that extends completely around a perimeter of the elongated element would accommodate any wear profile that the elongated element might acquire due to wear.

As the temperature changes, the ultrasound velocity in the elongated member changes, resulting in a change of travel times of the ultrasound waves from the proximal end of the elongated member to the extreme end of the wear face and acoustic reference markers. To correct the effect of temperature on the time of flight of the ultrasound waves propagating inside the elongated element, echo signals from the various acoustic reference markers can be used to determine the current ultrasound velocity. For example, let $d_k$ and $t_k$ be the distance between the proximal end of the elongated member and a selected acoustic reference marker k and the roundtrip travel time of the corresponding echo signal, the current ultrasound velocity vc can be obtained as $vc=2*d_k/t_k$. If the distance between the proximal end of the elongated member and the selected acoustic reference marker is unknown but the initial length of the elongated member is known, the current ultrasound velocity can be determined as $vc=(2*l_0/t_0)*(t_k/t_{k0})$, where $l_0$ is the initial bolt length, $t_0$ and $t_{k0}$ respectively the round trip travel times of the ultrasound waves from the proximal end of the elongated member to the distal end and the selected acoustic reference marker k of the elongated member measured at the same time and before the elongated member was put to use, and $t_k$ the currently measured round trip travel time of the ultrasound waves from the proximal end of the elongated member to the selected acoustic reference marker k. Then the value of vc is used to calculate the distances from the proximal end to the edge(s) and the extreme end of the wear face at the distal end of the elongated element.

As indicated above, in order to make installation of the sensing probe more practical without having to align a marked side of the elongated element towards a given direction, perimetrical acoustic reference markers are used. Perimetrical acoustic reference markers are particularly useful for generating echo signals for determining current ultrasound velocity when calculating length of the elongated element. One difficulty with using a perimetrical acoustic reference marker is that when the lower edge of the worn tip of the elongated element is passing a lower boundary of an acoustic reference marker, the change in waveform of the echo signal from the acoustic reference marker may not be obvious because the remaining portion of the acoustic reference marker is still the main contributor to the echo signal. Therefore, the signal processing method should be sensitive enough to a small change in waveform in order to determine the correct timing for measurement of the difference in length of the elongated element between the extreme end and an edge of the wear face. Another difficulty with a perimetrical acoustic reference marker is that the echo signal from a perimetrical acoustic reference marker will remain and could interfere with the echo signal from extreme end of the tip until the extreme end of the tip completely passes the acoustic reference marker and the acoustic reference marker will not exist anymore, reducing accuracy of the measurement of the longest distance between the proximal and distal ends of the elongated element. Although perimetrical acoustic reference markers may not provide as accurate length measurement results as acoustic reference markers on a longitudinal side of the elongated element for the period between when the lower edge of the tip touches the acoustic reference marker and when the extreme end of the tip point passes the acoustic reference marker, the convenience of installing a sensing probe without having to orient the sensing probe may overweigh the slight sacrifice in accuracy of the length measurement.

In another aspect, signature differences in the echo signal waveforms generated from different angles of a worn tip could be used to determine wear profile of the tip. To achieve this, the waveform of the echo signal reflected off the wear face will be compared with waveforms stored in a database containing a mapping between waveforms and corresponding wear profiles. A wear profile in the said database that provides the maximum similarity between its corresponding waveform and the waveform of the currently captured echo signal reflected off the wear face will be used as an estimate of the actual wear profile of the tip. Using signature differences in waveform to determine wear profile could replace or supplement the use of acoustic reference markers.

Figure 7A:
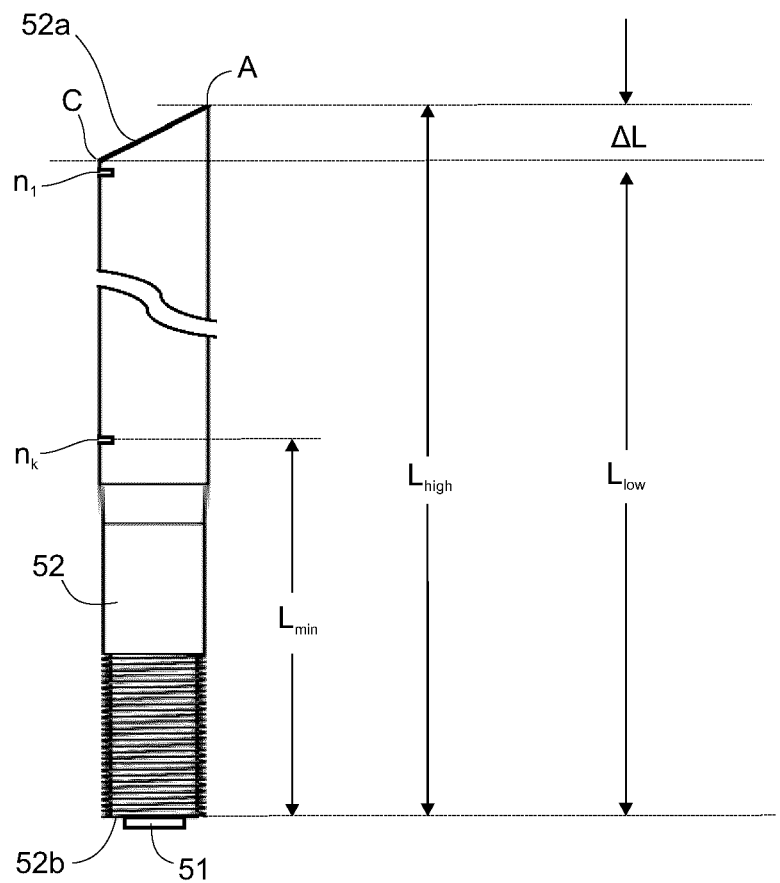
FIG. 7A depicts a schematic diagram of a steel liner bolt having an oblique wear face and having reference notches incised on a low side of the steel liner bolt.
Figure 8A:
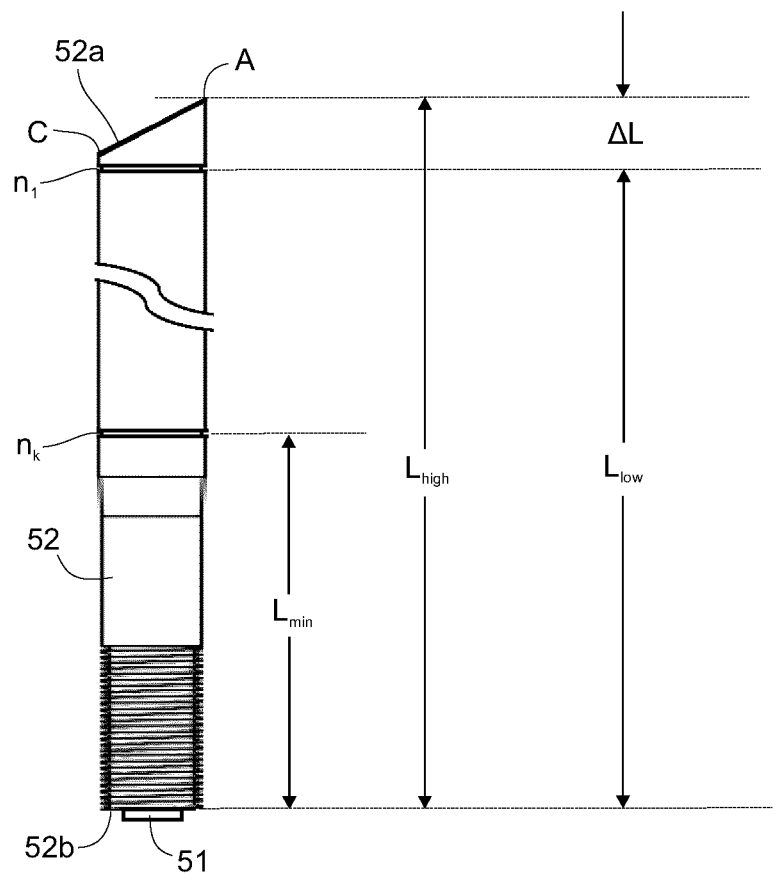
FIG. 8A depicts a schematic diagram of a steel liner bolt having an oblique wear face and having reference notches incised circumferentially around the bolt.

With reference to FIG. 7A and FIG. 8A, embodiments of instrumented steel liner bolts having an oblique wear face are illustrated, the bolts 52 having two reference notches, a first notch $n_1$ and a last notch $n_k$, incised thereon. In FIG. 7A, the reference notches $n_1$ and $n_k$ are incised only on a low side of the bolts 52 so that the notches $n_1$ and $n_k$ are aligned with the future lower edge C when the bolt 52 wears. In FIG. 8A, the reference notches $n_1$ and $n_k$ are incised as perimetrical notches around a perimeter of the bolt 52, which obviates the need to predict alignment of the notches $n_1$ and $n_k$ with the future lower edge C when the bolt 52 wears. The first notch $n_1$ is preferably incised at such a height that when the lower edge C reaches the first notch $n_1$, the wear profile is already well developed whereby the shape of the wear profile remains fairly stable as the bolt 52 further wears. The last notch $n_k$ is incised at a level of minimum acceptable wear length $L_{min}$ for the bolt 52. Echo signal from any of the notches $n_1$ and $n_k$ or any other notches in-between is used to determine and correct effect of temperature on time of flight of the ultrasonic waves propagating inside the bolt 52, to permit accurate measurement of $L_{high}$ and $\Delta L$.

Figure 7B:
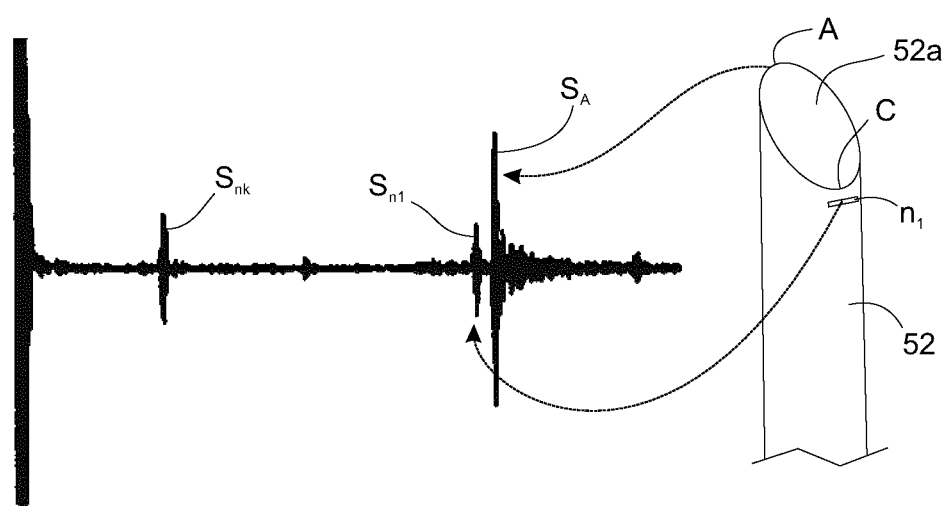
FIG. 7B depicts an ultrasound echo signal obtained using a shear wave ultrasound transducer on the steel liner bolt configured as in FIG. 7A.

FIG. 7B shows an example of a waveform obtained for the instrumented bolt of FIG. 7A and using shear ultrasound waves. The bolt was a cylindrical steel rod machined to have a length of 500 mm and a tip of 30°. The tip angle is measured between a line extending from the upper edge of the tip parallel to the proximal face and a line parallel to a face of the tip of the bolt. The bolt was machined with two notches: notches: a) 1 mm deep at 150 mm from the proximal end; and, b) 1 mm deep at 484 mm from the proximal end. The proximal end had a cut face to which was mounted a 2.25 MHz shear wave lead zirconate titanate (PZT) wafer with shear wave polarization parallel to the face of the tip. In FIG. 7B, echoes from the extreme end A of the tip and from the first notch $n_1$ and last notch $n_k$ are indicated with $S_A$, $S_{n1}$, and $S_{nk}$, respectively and are clearly identifiable. However, no echo from the lower edge C of the worn tip of the bolt 52 is observable. As the lower edge of the worn tip progresses further to reach the notch $n_1$, the waveform of $S_{n1}$ changes. When this change in the waveform is observed, the difference $\Delta L$ between $L_{high}$ and $L_{low}$ is determined by using the echo signal $S_{n1}$ reflected off the first notch $n_1$ and an echo signal $S_A$ reflected off the extreme end A of the tip. As wear progresses further, $L_{high}$ can always be determined using the echo signal $S_A$ reflected off the extreme end A of the tip, and the newly obtained value of $\Delta L$ will be used as a measure of liner wear profile surrounding the instrumented bolt until the lower edge C reaches the next notch and then the value of $\Delta L$ will be updated. Once the lower edge C passes a notch, the echo signal for that notch disappears from the waveform.

Figure 8B:
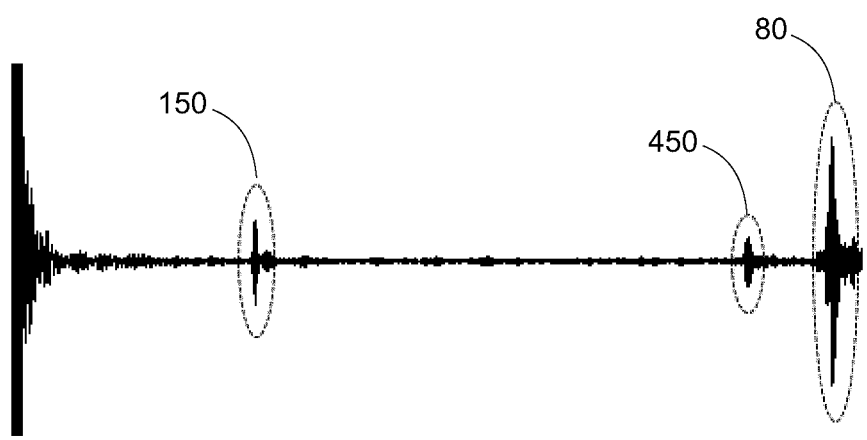
FIG. 8B depicts an ultrasound echo signal obtained using a shear wave lead zirconate titanate (PZT) ultrasound transducer mounted on a proximal end of a cylindrical steel bolt machined to have an oblique tip of 30° and two circumferential notches: a) 0.07 mm deep and 0.75 mm wide at 150 mm from the transducer end; and, b) 0.06 mm deep and 0.75 mm wide at 450 mm from the transducer end.

FIG. 8B shows an example of a waveform obtained for the instrumented bolt of FIG. 8A and using shear ultrasound waves. The bolt was a cylindrical steel rod machined to have a length of 500 mm and a tip angle of 30°. The tip angle is measured between a line extending from the upper edge of the tip parallel to the proximal face and a line parallel to a face of the tip of the bolt. The bolt was machined with two circumferential notches: a) 0.07 mm deep and 0.75 mm wide at 150 mm from the proximal end; and, b) 0.06 mm deep and 0.75 mm wide at 450 mm from the proximal end. The proximal end had a cut face to which was mounted a 4 MHz shear wave lead zirconate titanate (PZT) wafer with shear wave polarization parallel to the face of the tip. As illustrated in FIG. 8B, the ultrasound method was able to detect both an ultrasound echo 150 from the 150 mm notch and an ultrasound echo 450 from the 450 mm notch, as well as an ultrasound echo 80 from the tip of the steel bolt.

Figure 8C:
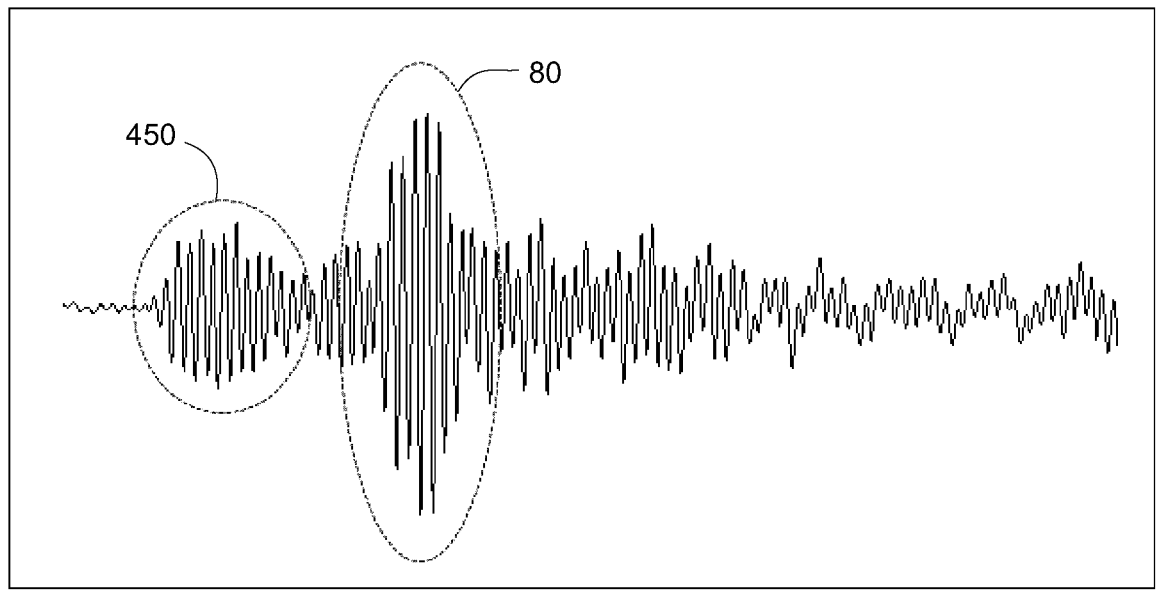
FIG. 8C depicts an ultrasound echo signal illustrating a change in waveform of an ultrasound echo from a circumferential notch as a lower edge of an angled tip of the bolt meets the lower boundary of the notch.
Figure 8C:
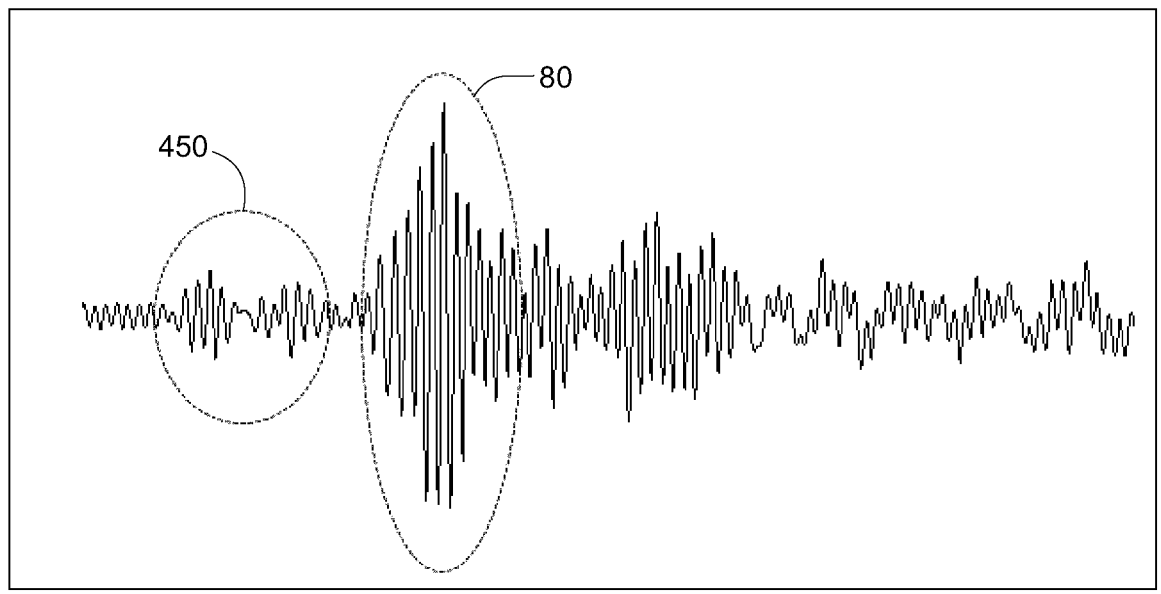

As illustrated in FIG. 8C, the waveform of the ultrasound echo 450 from the 450 mm notch undergoes a distinct change as the lower edge of the angled tip of the bolt meets the lower boundary of the 450 mm notch (lower panel) when compared to the waveform of the ultrasound echo 450 from the 450 mm notch when the lower edge meets the upper boundary of the 450 mm notch (upper panel).

While notches between the first notch $n_1$ and the last notch $n_k$ are not illustrated in FIG. 7A (and FIG. 8A), there are preferably a sufficient number of other notches between the first and last notches to provide sufficient updates of $\Delta L$ to sufficiently calculate the extent and rate of wear on a continuous basis. The same approach applies to situations where the instrumented bolt 52 has a rounded wear tip, such as in FIG. 5C where the extreme end of the tip is B, and the lower edges of the tip are D and E. If perimetrical notches were inscribed on both sides of the instrumented bolt 52 in FIG. 5C, echo signals related to both of the edges D and E can be monitored.

Figure 9E:
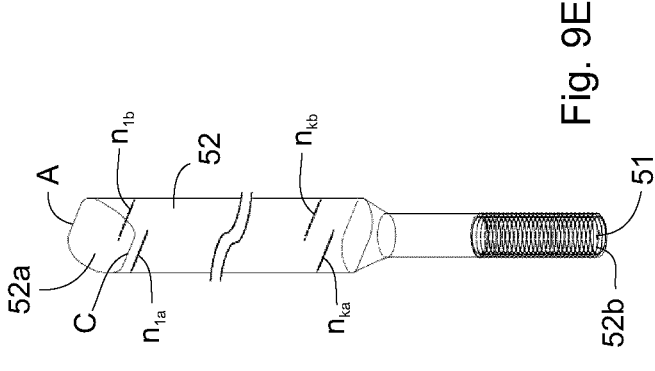
FIG. 9E depicts a perspective diagram of an instrumented non-cylindrical liner bolt having an oblique wear face and having reference notches incised on two sides of the bolt, and a layout of a shear wave ultrasound transducer.
Figure 9F:
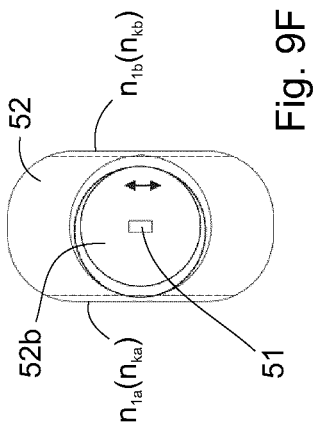
FIG. 9F depicts a view of a proximal end of the bolt of FIG. 9E.
Figure 9C:
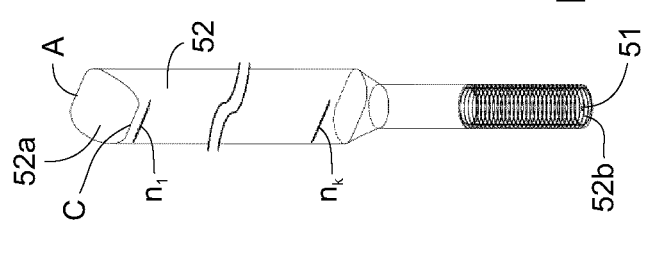
FIG. 9C depicts a perspective diagram of an instrumented non-cylindrical liner bolt having an oblique wear face and having reference notches incised on a low side of the bolt, and a layout of a shear wave ultrasound transducer.
Figure 9D:
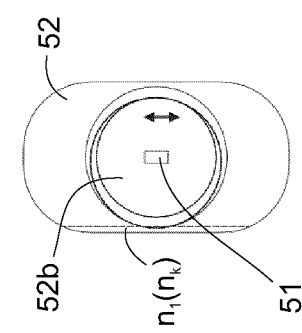
FIG. 9D depicts a view of a proximal end of the bolt of FIG. 9C.
Figure 9A:
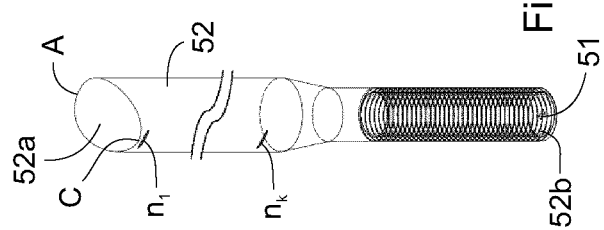
FIG. 9A depicts a perspective diagram of an instrumented cylindrical liner bolt having an oblique wear face and having reference notches incised on a low side of the bolt, and a layout of a shear wave ultrasound transducer.
Figure 9B:
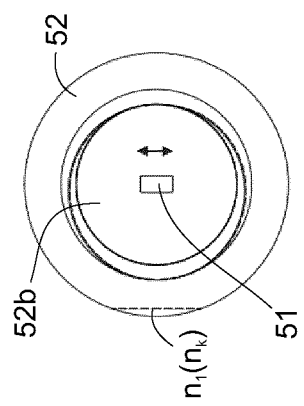
FIG. 9B depicts a view of a proximal end of the bolt of FIG. 9A.

The methods described above for determining wear at the distal end of an instrumented bolt are applicable to different bolt geometries, for examples, those illustrated in FIG. 9A with a circular cross-section of a body of the bolt 52, and FIG. 9C and FIG. 9E with non-circular cross-sections. In FIG. 9B and FIG. 9C, the bolt 52 is assumed to wear quasi-uniformly in one lateral direction, while non-uniformly in the orthogonal lateral direction.

Therefore, the methods described above are applied to the non-uniform wear profile to determine $L_{high}$, $\Delta L$ and $L_{low}$ for the bolts 52 in all three cases. As seen in FIG. 9E, notches can be incised on more than one side of the instrumented bolt 52 for determination of $\Delta L$ using the methods described above. FIG. 9E depicts the instrumented bolt 52 with notches incised on two sides of the bolt 52 indicated by $n_{1a}$, $n_{ka}$ and $n_{1b}$, $n_{kb}$, respectively. Having notches on more than one side is useful in situations where a future lower side of the wear face (i.e., the side with lower edge C) is unknown at the time of bolt installation but the value of $\Delta L$ and $L_{low}$ are to be determined regardless of the orientation of the bolt 52 at installation. To increase the detectability of echo signals reflected off the worn tip and notches, it may be preferable to align the polarization direction (the double-headed arrows in FIG. 9B, FIG. 9D and FIG. 9F) of the shear wave transducer with the direction of notches or with a direction that is tangential with the lower edge and the extreme end of the wear face. The sensitivity of a worn tip or of a notch to the polarization direction of the shear wave transducer may vary according to bolt length and location of the notch. The applicability of the disclosed method is not limited by the polarization direction of the shear wave transducer illustrated in FIG. 9B, FIG. 9D and FIG. 9F or presented elsewhere in this disclosure.

Figure 9G:
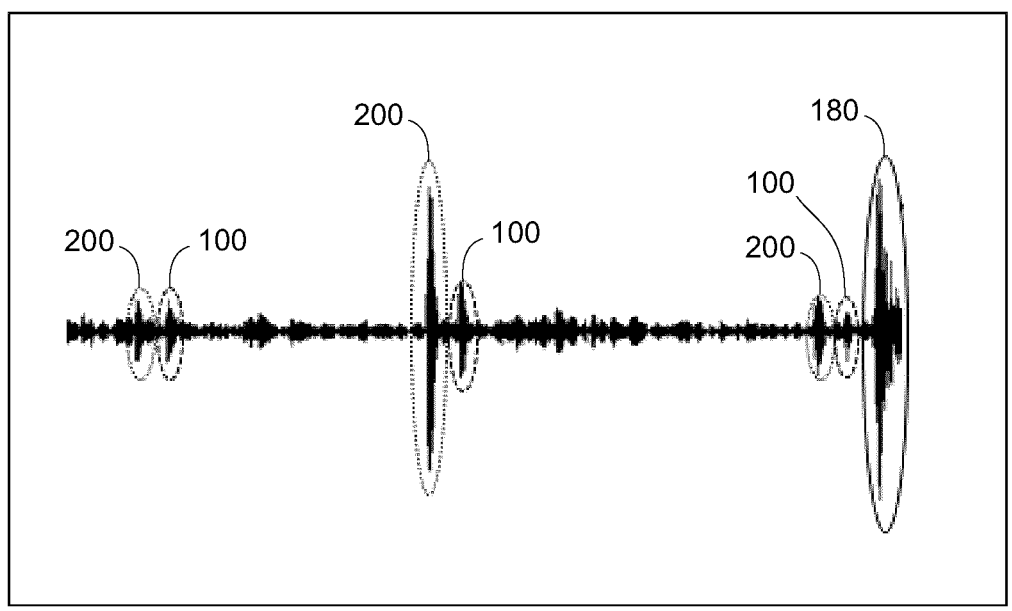
FIG. 9G depicts an ultrasound echo signal obtained using a shear wave lead zirconate titanate (PZT) ultrasound transducer mounted on a proximal end of a commercially available steel liner bolt machined with six notches: three 2 mm deep at 240 mm, 429 mm and 680 mm the proximal (sensor) end of the bolt, and three 1 mm deep at 260 mm, 450 mm and 700 mm from the proximal (sensor) end of the bolt, and an oblique tip of 5°.

FIG. 9G shows an example of a waveform obtained for the instrumented bolt of FIG. 9E and using shear ultrasound waves. The bolt was a 723 mm long oval-head bolt with 90 mm and 51 mm being the wide and the narrow widths of the head section, and 48 mm and 666 mm the diameter and the length of the cylindrical section. The bolt was machined to have a tip angle of 5°. The tip angle is measured between a line extending from the upper edge of the tip parallel to the proximal face and a line parallel to a face of the tip of the bolt. The bolt was machined with six notches: three 2 mm deep at 240 mm, 429 mm and 680 mm the proximal (sensor) end of the bolt, and three 1 mm deep at 260 mm, 450 mm and 700 mm from the proximal (sensor) end of the bolt. Notch width for all notches was 0.90 mm. The proximal end had a cut face to which was mounted a 2.5 MHz shear wave lead zirconate titanate (PZT) wafer with shear wave polarization parallel notches. As illustrated in FIG. 9G, the ultrasound method was able to detect ultrasound echoes 100 from all three of the 1 mm deep notches and ultrasound echoes 200 from all three of the 2 mm deep notches, as well as an ultrasound echo 180 from the tip of the steel bolt.

In the following section, methods for determining the values of $L_{high}$, $\Delta L$ and $L_{low}$, and, if applicable, the values of $L_{mid}$ and $\Delta L_{mid}$, are described.

Figure 10B:
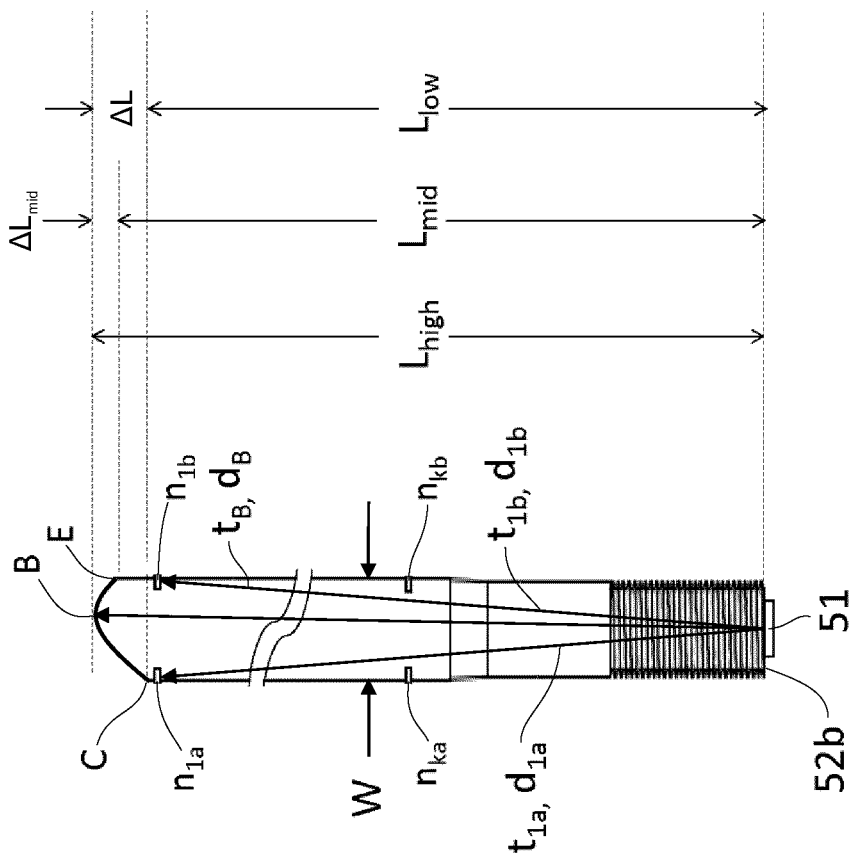
FIG. 10B depicts a schematic diagram of a steel liner bolt having a rounded wear face and having reference notches incised symmetrically on two sides of the bolt.
Figure 10A:
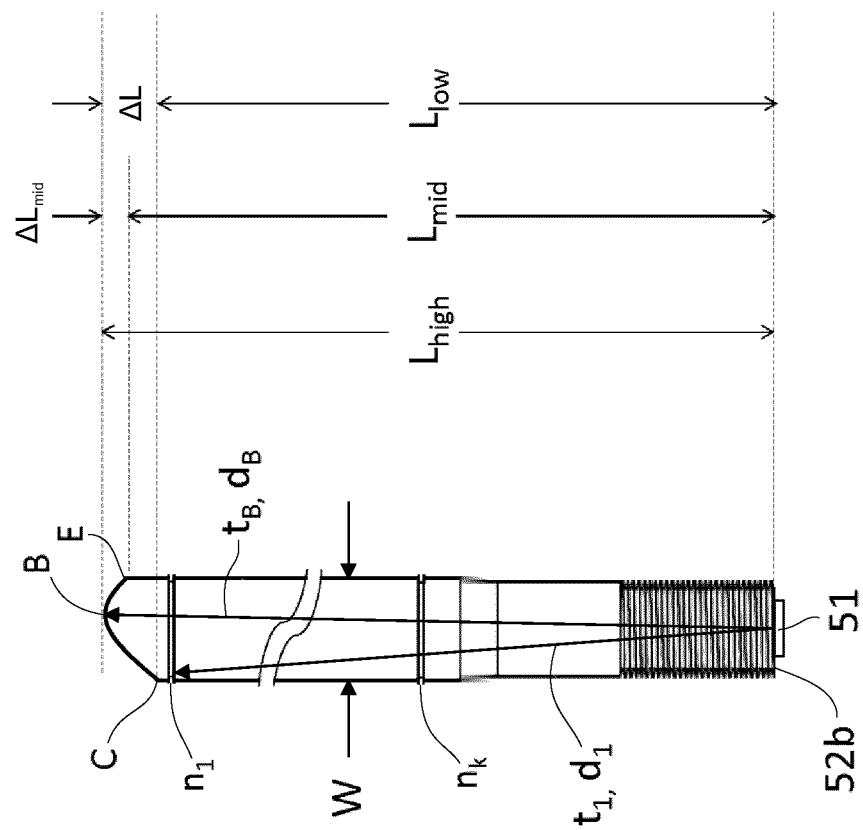
FIG. 10A depicts a schematic diagram of a steel liner bolt having a rounded wear face and having reference notches incised circumferentially around the bolt.

Refer to FIG. 10A, for an elongated element having a perimetrical notch that extends completely around a perimeter of the elongated element, the method for determining the wear profile of a rounded worn tip comprises: tracking echo signals reflected off the current distalmost notch on the elongated element (e.g., $n_1$); when the waveform of the echo signal reflected off the notch starts to change (this happens when the lower edge C of the wear face reaches the notch), determining the round-trip travel times of the echo signals from the notch, $t_1$, and from the extreme end B of the wear face, $t_B(n_1)$, where $t_B(n_1)$ denotes the value of $t_B$ when notch $n_1$ is being reached by the lower edge C of the wear face, and then determining the distances from the proximal end 52b of the elongated element to the notch, $d_1$, and to the extreme end B of the wear face, $d_B(n_1)$, where $d_B(n_1)$ denotes the value of $d_B$ when notch $n_1$ is being reached by the lower edge C of the wear face, according to $d_1 = vc*t_1/2$ and $d_B(n_1) = vc*t_B(n_1)/2$, where vc is the ultrasound velocity in the elongated element and determined as per procedure disclosed in this application; then determining ΔL according to $$\Delta L\ d_B(n_1) \approx d_b(n_1) - \sqrt{d_1^2 - (W/2)^2},$$

where W is the diameter or thickness of the body of the bolt 52. From this point on and until the next notch is reached by the wear face, estimates of current $L_{high}$ and $L_{low}$ values are determined according to $L_{high} = vc*t_B/2$, and $L_{low} = vc*t_B/2 - \Delta L$ in which vc and $t_B$ are respectively the current ultrasound velocity and the current the round-trip travel time from the proximal end 52b of the elongated element to the extreme end B of the wear face, and ΔL was obtained above. The above approach also applies to an oblique wear face where the extreme end B of the wear face joins the edge point E. However, perimetrical notches as presented would not allow the values of $L_{mid}$ and $\Delta L_{mid}$ to be determined.

Refer to FIG. 10B, for an elongated element having notches symmetrically on two sides of the element, the method for determining the wear profile of a rounded worn tip comprises: tracking echo signal reflected off the current distalmost pair of notches on the elongated element (e.g., $n_{1a}$ and $n_{1b}$); when the waveform of the echo signal reflected off the notches starts to change (this happens when the lower edge C of the wear face reaches the notch $n_{1a}$), determining the round-trip travel times of echo signals from the notches ($n_{1a}$ and $n_{1b}$), $t_{1a}$, and from the extreme end B of the wear face, $t_B(n_{1a})$, where $t_B(n_{1a})$ denotes the value of $t_B$ when notch $n_{1a}$ is being reached by the lower edge C of the wear face; then determining distances from the proximal end 52b of the elongated element to the notches ($n_{1a}$ and $n_{1b}$), $d_{1a}$ (which is the same as $d_{1b}$), and to the extreme end B of the wear face, $d_B(n_{1a})$, where $d_B(n_{1a})$ denotes the value of $d_B$ when the notch $n_{1a}$ is being reached by the lower edge C, according to $d_{1a} = vc*t_{1a}/2$ and $d_B(n_{1a}) = vc*t_B(n_{1a})/2$, where vc is the ultrasound velocity in the elongated element and determined as per procedure disclosed in this application; then determining DL according to $$\Delta L \approx d_B(n_{1a}) - \sqrt{d_{1a}^2 - (W/2)^2},$$

where W is the diameter or thickness of the body of the elongated element 52. After the lower edge C passes the notch $n_{1a}$, the echo signal reflected off the notch $n_{1a}$ will disappear but the echo signal reflected off the notch $n_{1b}$ will remain and will start to change in waveform when the upper edge E of the wear face reaches the notch $n_{1b}$, and when this happens, measuring the current round-tip travel time from the proximal end 52b of the elongated element to the extreme end B of the wear face, $t_B(n_{1b})$; determining the distance from the proximal end 52b of the elongated element to the extreme end B of the wear face, $d_B(n_{1b})$, according to $d_B(n_{1b}) = vc*t_B(n_{1b})/2$; then determining $\Delta L_{mid}$ according to $$\Delta L_{mid} \approx d_B(n_{1b}) - \sqrt{d_{1a}^2 - (W/2)^2}.$$

From this point on and until the next notch is reached by the wear face, estimates of current $L_{high}$, $L_{mid}$ and $L_{low}$ values are determined according to $L_{high} = vc*t_B/2$, $L_{mid} = vc*t_B/2 - \Delta L_{mid}$, and $L_{low} = vc*t_B/2 - \Delta L$ in which vc and $t_B$ are respectively the current ultrasound velocity and the current the round-trip travel time from the proximal end 52b of the elongated element to the extreme end B of the wear face, and $\Delta L_{mid}$ and ΔL were obtained above. The above approach also applies to an oblique wear face where the extreme end B of the wear face joins the edge point E. For an elongated element having only notches on the low side of the bolt (i.e., side of lower edge C), ΔL, $L_{high}$ and $L_{low}$ can be obtained according to the same procedure described above.

Figure 10D:
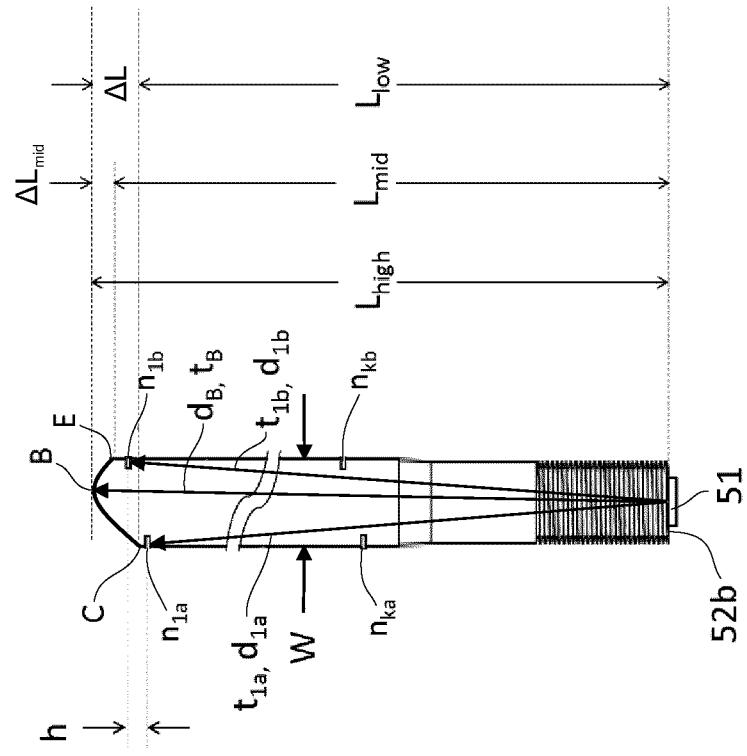
FIG. 10D depicts a schematic diagram of a steel liner bolt having a rounded wear face and having reference notches incised asymmetrically on two sides of the bolt.
Figure 10C:
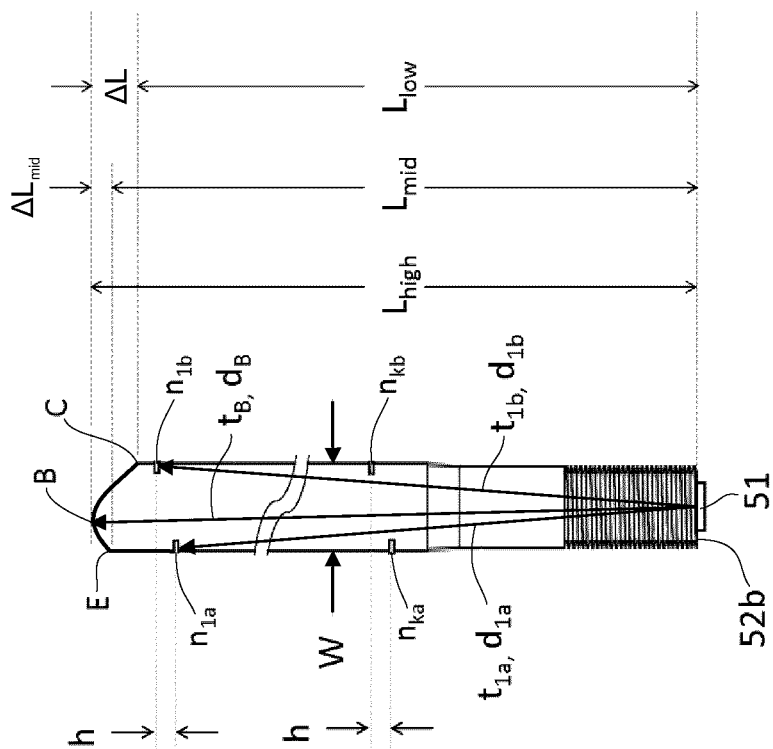
FIG. 10C depicts a schematic diagram of a steel liner bolt having a rounded wear face and having reference notches incised asymmetrically on two sides of the bolt.

It is possible to further determine on which side of an elongated element falls the lower edge C or the upper edge E or the extreme end A by incising notches on two sides of an elongated element but at different heights. Referring to FIGS. 10C and 10D, let h be the distance between a pair of notches $n_{1a}$ and $n_{1b}$ ($n_{ka}$ and $n_{kb}$) in the longitudinal direction of the elongated element. Without losing generality, assuming $n_{1b}$ is closer to the extreme end of the wear face of the bolt in the longitudinal direction. If the lower edge C is on the side of notch $n_{1b}$ (FIG. 10C), notch $n_{1b}$ will be reached by the wear face (lower edge C) before notch $n_{1a}$ is reached by the upper edge E. If the lower edge C is on the side of the notch $n_{1a}$, then either one of notches $n_{1a}$ and $n_{1b}$ could be reached by the wear face before the other (FIG. 10D). In order to determine the wear profile on worn tip of the elongated element, proceed as follows: tracking echo signal reflected of notch $n_{1a}$, and whenever a change in waveform of the echo signal is observed, determining the round-trip travel times of echo signals from the notch $n_{1a}$, $t_{1a}$, and from the extreme end B of the wear face, $t_B(n_{1a})$, where $t_B(n_{1a})$ denotes the value of $t_B$ when notch $n_{1a}$ is being reached by an edge of the wear face; and then determining the values of $d_{1a}$ and $d_B(n_{1a})$ according to $d_{1a} = vc*t_{1a}/2$ and $d_B(n_{1a}) = vc*t_B(n_{1a})/2$, where vc is the ultrasound velocity in the elongated element and determined as per procedure disclosed in this application; then calculating $$\Delta L_a \approx d_B(n_{1a}) - \sqrt{d_{1a}^2 - (W/2)^2},$$

where W is the diameter or thickness of the body of the elongated element 52; tracking echo signal reflected of notch $n_{1b}$, and whenever a change in waveform of the echo signal is observed, determining the round-trip travel times of echo signals from the notch $n_{1b}$, $t_{1b}$, and from the extreme end B of the wear face, $t_B(n_{1b})$, where $t_B(n_{1b})$ denotes the value of $t_B$ when notch $n_{1b}$ is being reached by an edge of the wear face; and then determining the values of $d_{1b}$ and $d_B(n_{1b})$ according to $d_{1b} = vc*t_{1b}/2$ and $d_B(n_{1b}) = vc*t_B(n_{1b})/2$, where vc is the ultrasound velocity in the elongated element and determined as per procedure disclosed in this application; then calculating $$\Delta L_b \approx d_B(n_{1b}) - \sqrt{d_{1b}^2 - (W/2)^2}.$$

If $\Delta L_a > \Delta L_b$, then the lower edge C is on the side of notch $n_{1a}$ and $\Delta L = \Delta L_a$, $\Delta L_{mid} = \Delta L_b$. If $\Delta L_a < \Delta L_b$, then the lower edge C is on the side of notch $n_{1b}$ and $\Delta L = \Delta L_b$, $\Delta L_{mid} = \Delta L_a$. If $\Delta L_a \approx \Delta L_b$, the wear profile would be considered symmetrical about the central axis of the elongated element. From this point on until next pair of notches have been reached by the wear face, estimates of current $L_{high}$, $L_{mid}$ and $L_{low}$ values are determined according to $L_{high} = vc*t_B/2$, $L_{mid} = vc*t_B/2 - \Delta L_{mid}$, and $L_{low} = vc*t_B/2 - \Delta L$ in which vc and $t_B$ are respectively the current ultrasound velocity and the current the round-trip travel time from the proximal end 52b of the elongated element to the extreme end B of the wear face, and $\Delta L_{mid}$ and $\Delta L$ were obtained above. It is to note that the above approach applies to an elongated element having an oblique tip on which the extreme end B of the wear face coincides with its upper edge point E and $\Delta L_{mid}$=0. In order for the method to work, the longitudinal distance (value of h) between two notches of the same pair needs to be sufficiently large so that echoes from the two notches are resolvable.

Ultrasound signal received by the wear measurement system not only contains the echo signal from the extreme end of the tip of the elongated element, but also background echoes from other part of the elongated element, for example, from thread of a bolt and notches. When the two categories of echoes overlap, the echo signal from the extreme end of the tip of the elongated element will be less discernable, making the measurement of $L_{high}$ less accurate. As the elongated element wears, the element becomes shorter and shorter, and as a result the echo signal from the extreme end of the tip of the element arrives sooner and sooner. In the meantime, the background echoes remain stable therefore can be subtracted from the received ultrasound signal to make the echo signal from the extreme end of the tip of the elongated element more discernable, resulting in more accurate measurement of $L_{high}$. This is particularly beneficial when the worn tip is no longer flat. In practice, a set of reference signals were to be taken at various temperatures far before the current wear measurement takes place. For each reference signal, the travel time from the proximal end of the elongated element to a selected acoustic marker (e.g., notch) is determined. For a current wear measurement, first an ultrasound signal from the instrumented elongated element is taken. From this signal, the travel time from the proximal end of the elongated element to the same selected acoustic marker (e.g., notch) is determined and then compared with a table of travel times to the same acoustic marker for all stored reference signals. The reference signal that has produced a travel time value closest to that produced by the current signal is selected and subtracted from the current signal for removable of background echoes for the determination of $L_{high}$. Since bolt temperature can affect the waveform of ultrasound signal, for the subtraction to work best for removal of background echoes, the current ultrasound signal and the selected reference signal need to be acquired at the same temperature. This travel time-based selection of reference signal provides an effective way in selecting a reference signal which was acquired at a temperature closest to the current temperature of the elongated element.

Figure 11A:
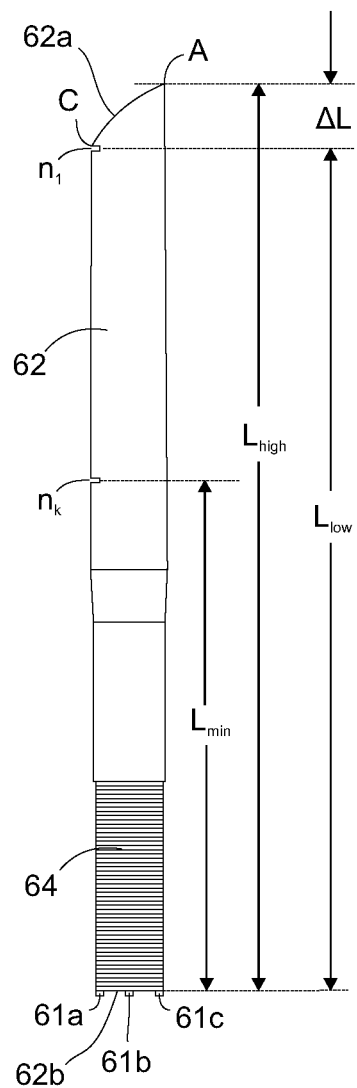
FIG. 11A and FIG. 11B depict schematic diagrams of instrumented steel liner bolts showing different tip shapes that the bolts may have as a result of wear in a mill, the steel bolts comprising reference notches on low sides thereof.
Figure 11B:
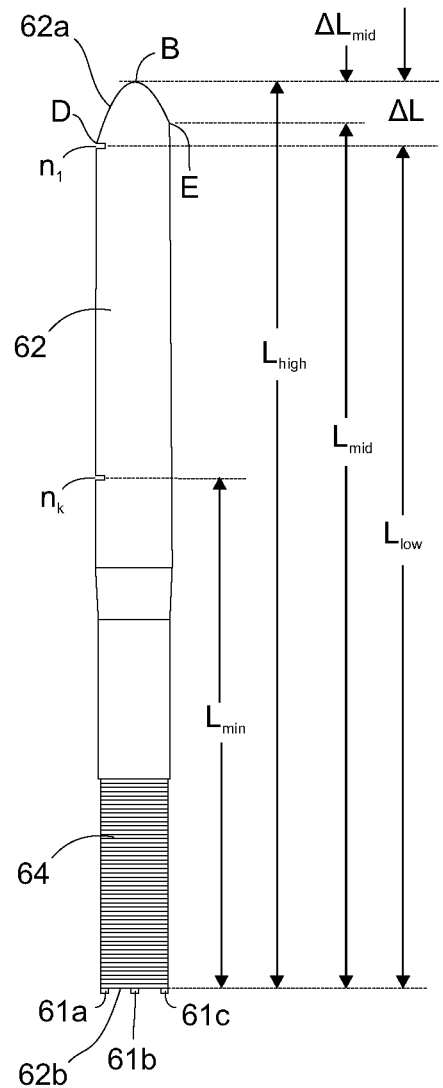
Figure 11C:
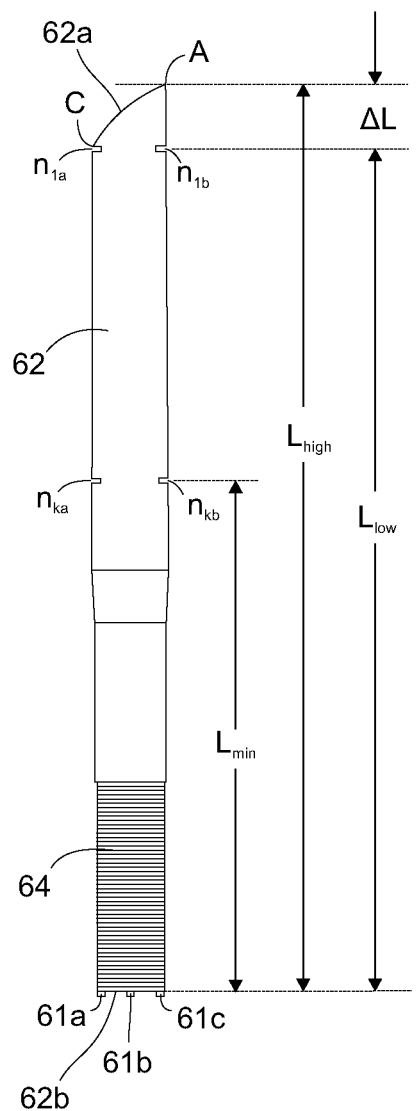
FIG. 11C and FIG. 11D depict schematic diagrams of instrumented steel liner bolts showing different tip shapes that the bolts may have as a result of wear in a mill, the steel bolts comprising reference notches on both sides thereof.
Figure 11D:
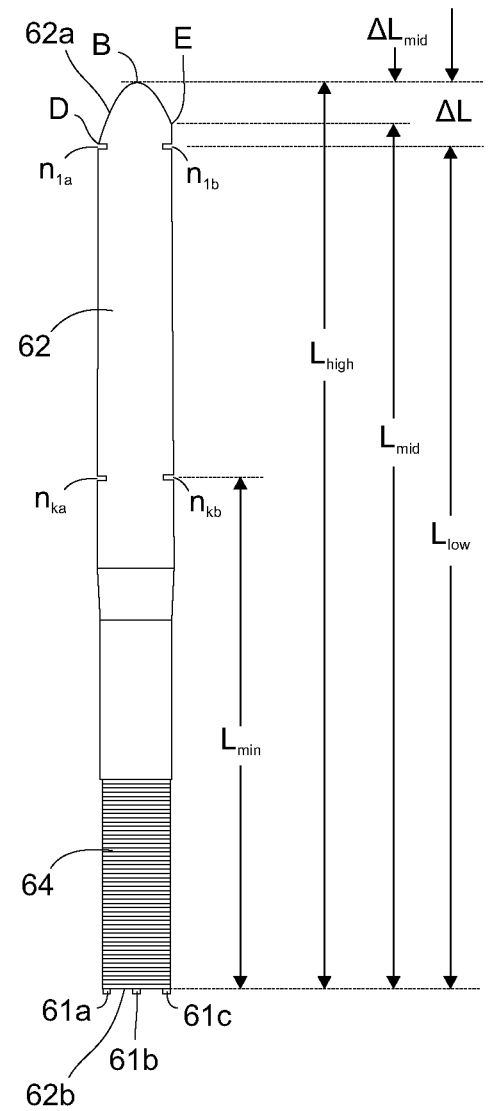
Figure 12:
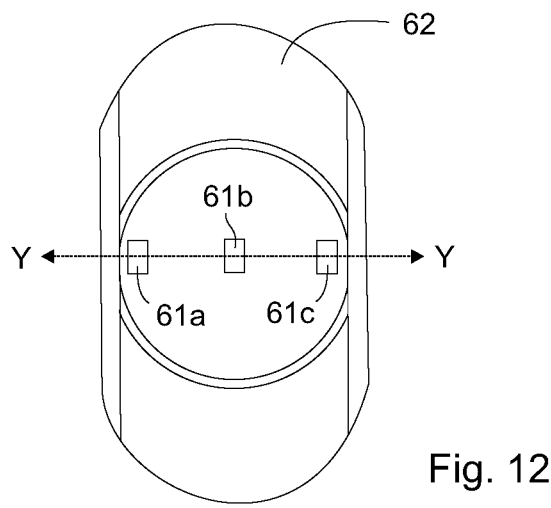
FIG. 12 depicts schematic diagram of an end view of a proximal end of an instrumented steel liner bolt sensing probe showing an ultrasound sensing arrangement comprising three electrically interconnected shear wave ultrasound transducers located on an end face of the steel bolt.
Figure 13:
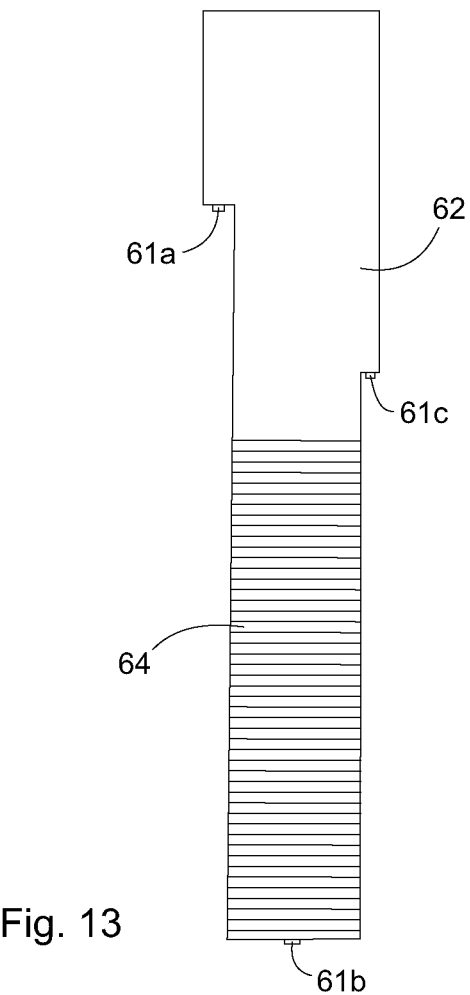
FIG. 13 depicts schematic diagram of a side view of a proximal end portion of an instrumented steel liner bolt sensing probe showing an ultrasound sensing arrangement comprising three electrically interconnected shear wave ultrasound transducers longitudinally spaced along the steel bolt.

With reference to FIG. 11A, FIG. 11B, FIG. 11C, FIG. 11D, FIG. 12, FIG. 13, FIG. 14A, FIG. 14B and FIG. 14C, for instrumented steel liner bolt sensing probes, three ultrasound sensors with shear wave ultrasound transducers 61a, 61b, 61c, for example shear wave PZT wafers, are mounted at proximal ends 62b of the steel bolts 62 along a central lateral line Y-Y (see FIG. 12). The ultrasound transducers 61a, 61b, 61c may be mounted in a coplanar manner on proximal end faces of the steel bolts 62, or the ultrasound transducers 61a, 61b, 61c may be mounted longitudinally offset from each other as shown in FIG. 13. The three ultrasound transducers 61a, 61b, 61c can be operated independently, in which case a three-channel ultrasonic system is used. The three ultrasound transducers 61a, 61b, 61c could instead be interconnected electrically to be excited at the same time, whereby the ultrasound echo signals received by each of them will overlap, in which case, only a single channel ultrasonic system is needed. If the $L_{low}$ sides of the steel bolts 62 can be predicted according to existing knowledge on liner wear evolution, first and last notches $n_1$ and $n_k$, and any other notches, may be incised on the $L_{low}$ sides of the steel bolts 62 (FIG. 11A and FIG. 11B). In FIG. 11A and FIG. 11B, the shear wave ultrasound transducers 61a, 61b, 61c shown mounted in a coplanar manner on the faces of the proximal ends 62b will capture echo signals reflected off the notches $n_1$ and $n_k$ and the extreme ends A and B of the tips of the steel bolts 62, and $L_{high}$, $\Delta L$ and $L_{low}$ are determined in the same manner as described previously. If the $L_{low}$ sides of the steel bolts 62 cannot be predicted, first notches $n_{1a}$, $n_{1b}$ and last notches $n_{ka}$, $n_{kb}$, and any other notches, may be incised on opposite sides of the steel bolts 62 at the same heights as shown in FIG. 11C and FIG. 11D, or at different heights as shown in FIG. 10C and FIG. 10D. Determinations of $L_{high}$, $\Delta L$ and $L_{low}$, and if applicable, $L_{mid}$ and $\Delta L_{mid}$, are accomplished in a similar manner as described previously. In FIG. 11C and FIG. 11D, the ultrasound transducers 61a capture echo signals reflected off the first and last notches $n_{1a}$ and $n_{ka}$, the ultrasound transducers 61c capture echo signals reflected off the first and last notches $n_{1b}$ and $n_{kb}$, and the ultrasound transducers 61c capture echo signals reflected off the extreme ends A, B of the tips of the steel bolts 62.

The three ultrasound transducers 61a, 61b, 61c shown can be of different types provided at least one is a shear wave ultrasound transducer. For example, ultrasound transducers 61a and 61b may be shear wave ultrasound transducers, while ultrasound transducers 61c are longitudinal wave ultrasound transducers. Since longitudinal and shear ultrasound waves travel at different velocities, echo signals from notches $n_{1a}$ and $n_{ka}$, captured by ultrasound transducers 61a will arrive at different times than echo signals from notches $n_{1b}$ and $n_{kb}$ captured by ultrasound transducers 61c, thereby simplifying the determination of which edge D or E in FIG. 11D is reaching a notch.

With reference to FIG. 13 in particular, to increase measurement accuracy, the ultrasound transducers 61a and 61c proximate lateral peripheries of the steel bolts 62 may be mounted at locations more distal of the proximal face away from threads 64 of the steel bolts 62, and further to the peripheries of the steel bolts 62 than depicted in FIG. 12. Such an arrangement gives the ultrasound transducers 61a and 61c higher sensitivity to echo signals from the notches and the extreme ends of the tip. Furthermore, ultrasound transducers 61a and 61c will not be or will be less affected by echo signals from the threads 64. In addition, longitudinally separating the ultrasound transducers 61a, 61b, 61c facilitates measuring $\Delta L_{mid}$ and $L_{mid}$ in addition to of $L_{high}$, $\Delta L$ and $L_{low}$. If a single-channel electronic system is used, three ultrasound transducers 61a, 61b, 61c will need to be interconnected electrically. To avoid overlap of echo signals, the minimum distance between the ultrasound transducers 61a, 61b, 61c is preferably sufficiently larger than the expected value of $\Delta L$ shown in FIG. 11B and FIG. 11D.

Figure 14A:
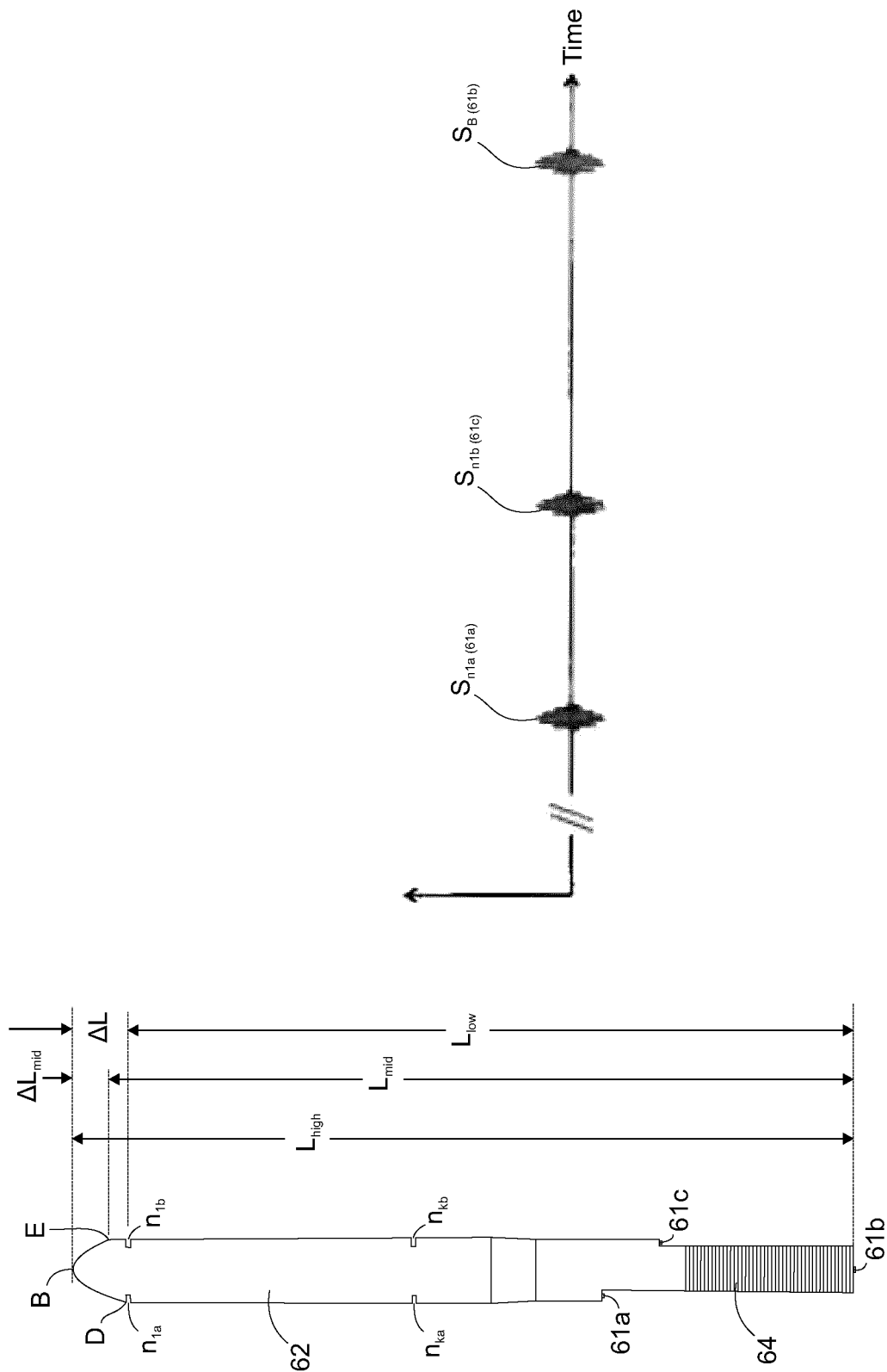
FIG. 14A depicts a schematic diagram of an instrumented steel liner bolt sensing probe having a rounded tip, reference notches on both sides of the steel bolt and an ultrasound sensing arrangement comprising three electrically interconnected shear wave ultrasound transducers longitudinally spaced along the steel bolt, and an illustrative ultrasound signal.
Figure 14B:
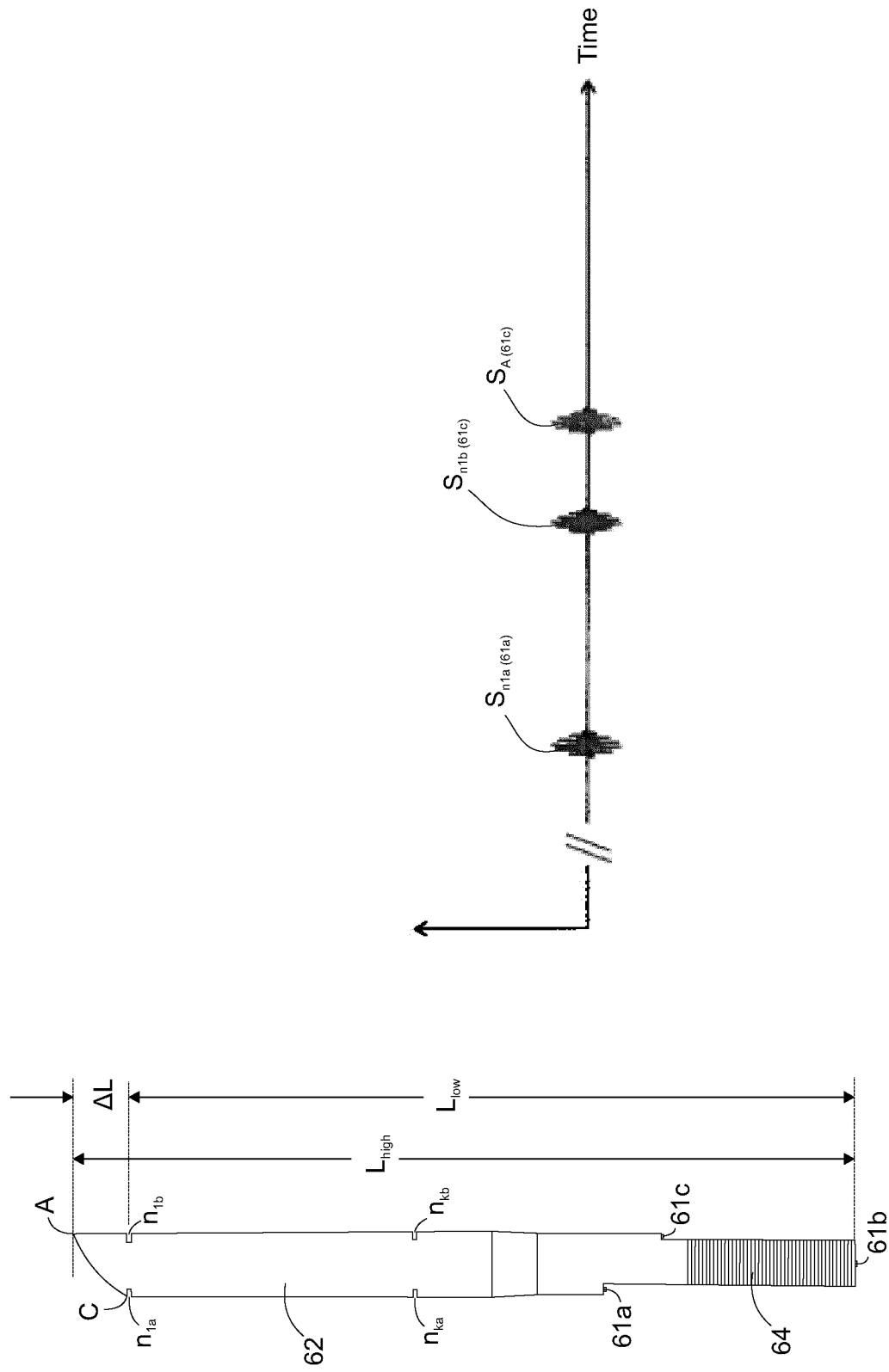
FIG. 14B depicts a schematic diagram of an instrumented steel liner bolt sensing probe having a tip with a curved bevel, reference notches on both sides of the steel bolt and an ultrasound sensing arrangement comprising three electrically interconnected shear wave ultrasound transducers longitudinally spaced along the steel bolt, and an illustrative ultrasound signal.
Figure 14C:
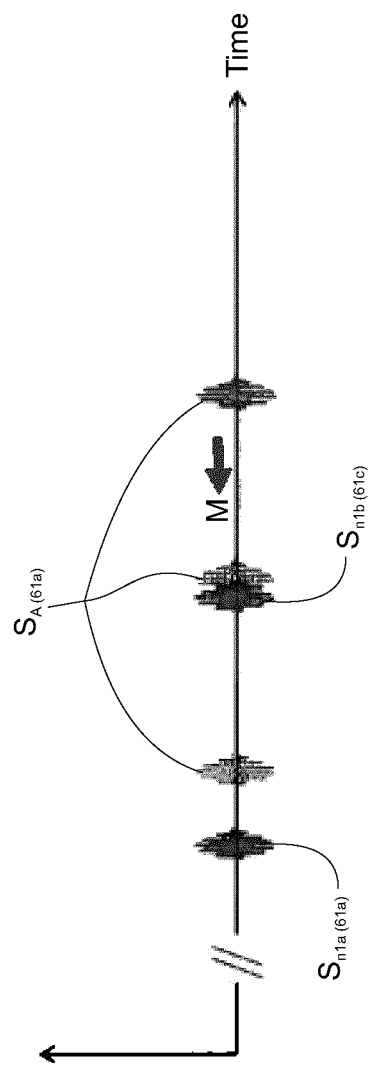
FIG. 14C depicts a schematic diagram of an instrumented steel liner bolt sensing probe, which is the same as the steel bolt sensing probe of FIG. 14B except for having the tip beveled on the opposite side in comparison to the bevel on the tip in FIG. 14B, and an illustrative ultrasound signal.
Figure 14C:
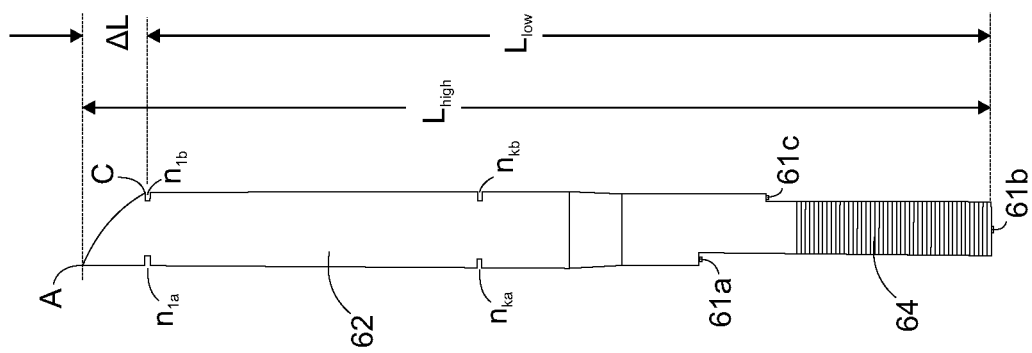

FIG. 14A, FIG. 14B and FIG. 14C show steel bolt sensing probes having tips with different wear profiles. The steel bolts 62 are incised with first notches $n_{1a}$ and $n_{1b}$ on opposite sides of the steel bolts 62 and with last notches $n_{ka}$ and $n_{kb}$ on opposite sides of the steel bolts 62. The ultrasound sensing arrangement comprises the three shear wave ultrasound transducers 61a, 61b, 61c electrically interconnected and longitudinally spaced along the steel bolts 62.

FIG. 14A shows a schematic of echo signals received by the interconnected ultrasound transducers 61a, 61b, 61c when the steel bolt 62 has a rounded wear profile. The first notch $n_{1a}$ will be reached by lower edge D of the tip before the other first notch $n_{1b}$ will be reached by lower edge E of the tip. At the moment the waveform of echo signal $S_{n1a(61a)}$, which is from the first notch $n_{1a}$ and captured by the ultrasound transducer 61a, starts to change, the measurement of arrival times of the echo signal $S_{n1a(61a)}$ from the first notch $n_{1a}$ and the echo signal $S_{B(61b)}$ from the extreme end B of the tip captured by the ultrasound transducer 61b permits determination of L. At the moment the waveform of echo signal $S_{n1b(61c)}$, which is from the other first notch $n_{1b}$ and captured by the ultrasound transducer 61c, starts to change, the measurement of arrival times of the echo signal $S_{n1b(61c)}$ from the other first notch $n_{1b}$ and the echo signal $S_{B(61b)}$ from the extreme end B of the tip captured by the ultrasound transducer 61b permits determination of $\Delta L_{mid}$. The values of $\Delta L$ and $\Delta L_{mid}$ permit future values of $L_{low}$ and $L_{mid}$ to be evaluated according to $L_{low} \cong L_{high} - \Delta L$ and $L_{mid} \cong L_{high} - \Delta L_{mid}$, where $L_{high}$ is determined by using the arrival time of the echo signal $S_{B(61b)}$ from the extreme end B of the tip.

FIG. 14B shows a schematic of echo signals received by the interconnected ultrasound transducers 61a, 61b, 61c when the steel bolt 62 has a curved bevel wear profile. The ultrasound sensing arrangement shown in FIG. 14B can also be used to determine which side of the steel bolt 62 is the $L_{low}$ side when the tip of the steel bolt 62 has a curved bevel wear profile. In FIG. 14B, echo signal $S_{n1a(61a)}$ from the first notch $n_{1a}$ is captured by the ultrasound transducer 61a and will be affected by the lower edge C of the tip before echo signal $S_{n1b(61c)}$ from the other first notch $n_{1b}$ captured by the ultrasound transducer 61c will be affected by the extreme end A of the tip. Echo signal $S_{A(61c)}$ from the extreme end A of the tip captured by the ultrasound transducer 61c will always arrive later than the echo signal $S_{n1b(61c)}$ from the other first notch $n_{1b}$ until the other first notch $n_{1b}$ is reached by the extreme end A of the tip. At the moment the echo signal $S_{n1a(61a)}$ from the first notch $n_{1a}$ starts to change, the measurement of arrival time of echo signal $S_{n1a(61a)}$ and arrival time of echo signal $S_{A(61c)}$ permits the value of $\Delta L$ to be determined. Then future value of $L_{low}$ can be evaluated according to $L_{low} \cong L_{high} - \Delta L$ where $L_{high}$ is determined by using the arrival time of the echo signal $S_{A(61c)}$ from the extreme end A of the tip. Since the echo signal $S_{n1a(61a)}$ from the first notch $n_{1a}$ changes before the echo signal $S_{n1b(61c)}$ from the other first notch $n_{1b}$, the $L_{low}$ side must be on the side of the ultrasound transducer 61a.

FIG. 14C shows a schematic of echo signals received by the interconnected ultrasound transducers 61a, 61b, 61c when the steel bolt 62 has a curved bevel wear profile on an opposite side as the curved bevel in FIG. 14B. Here, echo signal $S_{n1b(61c)}$ from the other first notch $n_{1b}$ captured by the ultrasound transducer 61c changes twice before echo signal $S_{n1a(61a)}$ from the first notch $n_{1a}$ captured by the ultrasound transducer 61a changes. Because the echo signal $S_{n1b(61c)}$ from the other first notch $n_{1b}$ changes before the echo signal $S_{n1a(61a)}$ from the first notch $n_{1a}$, the $L_{low}$ side must be on the side of the ultrasound transducer 61c. However, signal processing is more difficult. As the steel bolt 62 wears, echo signal $S_{A(61a)}$ from the extreme end A of the tip captured by the ultrasound transducer 61a will be moving in direction M towards, then overlapping with, and then moving away from the echo signal $S_{n1b(61c)}$ from the other first notch $n_{1b}$. However, the echo signal $S_{n1b(61c)}$ from the other first notch $n_{1b}$ is stable before the other first notch $n_{1b}$ has been reached by the extreme end A of the tip. When the echo signal $S_{A(61a)}$ from the extreme end A of the tip and the echo signal $S_{n1b(61c)}$ from the other first notch $n_{1b}$ overlap, a copy of the echo signal $S_{n1b(61c)}$ from the other first notch $n_{1b}$ recorded earlier can be subtracted from the current echo signal to make the echo signal from the extreme end A of the tip stand out to ensure measurement quality of $L_{high}$. Furthermore, to achieve good measurement accuracy of $L_{low}$, the distance between the ultrasound transducers 61a and 61c should be far enough so that when lower edge C of the tip moves close to the other first notch $n_{1b}$, the echo signal $S_{n1b(61c)}$ from other first notch $n_{1b}$ is well separated from echo signal $S_{A(61a)}$ from the extreme end A of the tip.

Figure 15B:
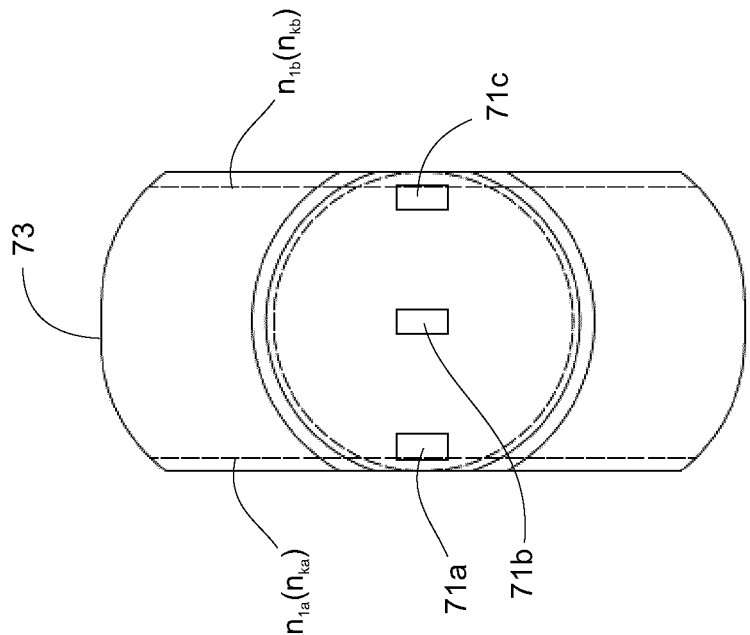
FIG. 15B depicts a cross-section view of an instrumented steel liner bolt sensing probe depicted in FIG. 15A.
Figure 15A:
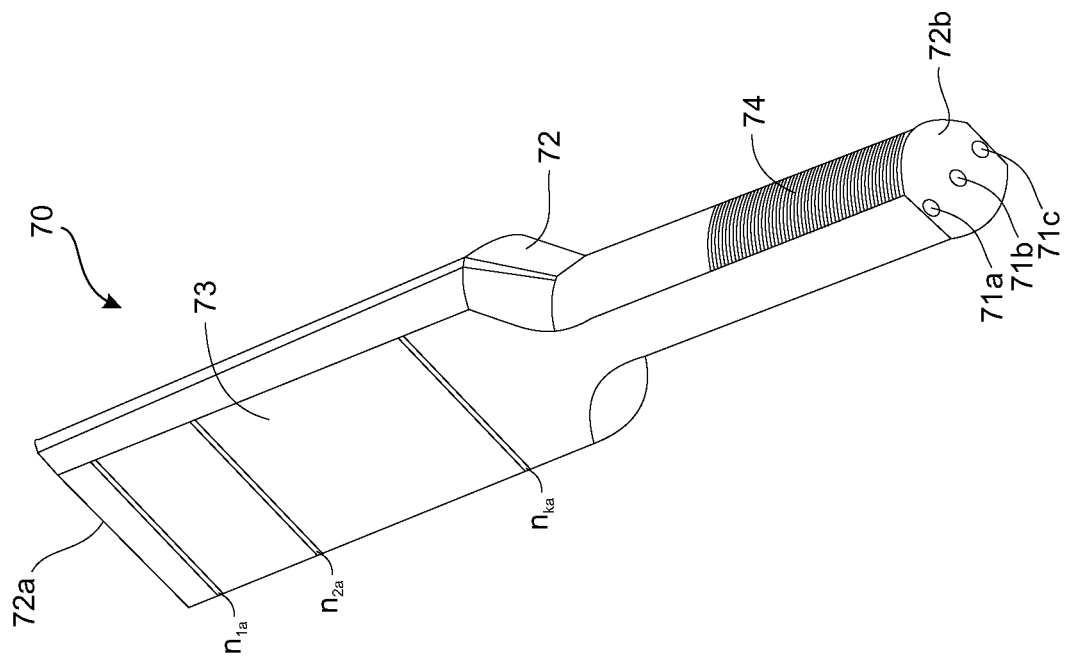
FIG. 15A depicts an instrumented steel liner bolt sensing probe having flattened portions on opposite sides and comprising reference notches on both of the flattened portions, the bolt having a cross-section comprising opposed curves joined by straight edges through the flattened portions of the wider body.

With reference to FIG. 15A and FIG. 15B, to further improve wear measurement accuracy, a steel bolt sensing probe 70 is provided with a steel bolt 72 that is flattened on opposite sides of a distal portion 73 of the steel bolt 72. The steel bolt 72 has a distal end 72a and a proximal end 72b. The distal portion 73 is wider than the proximal end 72b, which has a cross-section comprising opposed curves joined by straight edges. The flattened sides of the distal portion 73 are inscribed with reference notches $n_{1a}$, $n_{2a}$ and $n_{ka}$ and $n_{1b}$, $n_{2b}$ and $n_{kb}$. Mounted on a face of the proximal end 72b is an ultrasound sensing arrangement comprising three shear wave ultrasound transducers 71a, 71b, 71c. Curved sides of the proximal end 72b have threads 74 on which a nut may be threaded to secure the sensing probe 70 in the through-aperture in the shell of the mill. Measurements are made in the same manner as described above.

Figure 16:
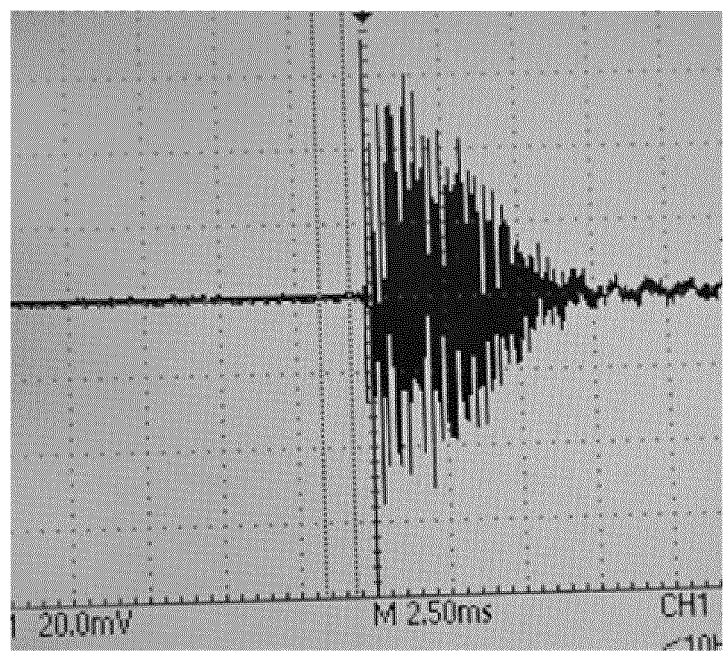
FIG. 16 depicts a vibration signal upon hitting the distal end of a 200 mm long cylindrical steel bolt.
Figure 17:
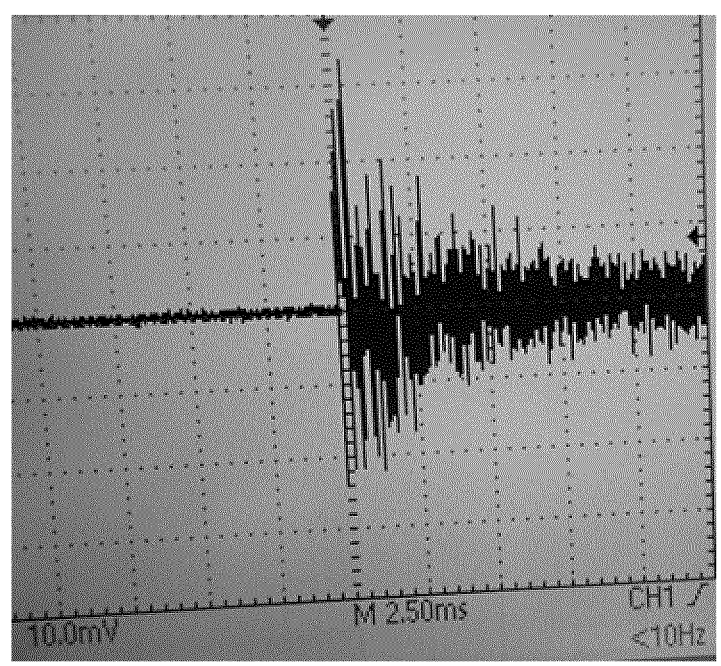
FIG. 17 depicts a vibration signal upon hitting the distal end of a 285 mm long oval-head bolt.

FIG. 16 shows a vibration signal upon hitting the distal end of a 200 mm long cylindrical steel bolt with the metallic shaft of a screw driver. The distal end of the bolt had a 60° tip. The signal was captured with the same shear wave ultrasound transducer used in FIG. 8B. FIG. 17 shows a vibration signal upon hitting the distal end of a 285 mm long oval-head bolt with the metallic shaft of a screw driver. The distal end of the bolt had a 45° tip. The signal was captured with the same shear wave ultrasound transducer used in FIG. 9G. The validity of using a same shear wave ultrasound transducer for both impact detection in a passive (listening) mode and wear measurement in an active (pulse echo) mode has therefore been proven.

The active mode for wear measurement uses ultrasound waves with center frequency in the 1 MHz to 10 MHz range. Depending on the highest frequency component of the signal, a sampling rate of 20 MHz to 100 MHz would usually be adequate. However, most noticeable vibrations caused by an impact on a rod suitable for mill monitoring fall in the audible frequency range, namely 20 to 20 kHz. A sampling frequency of 20 MHz to 100 MHz suitable for some ultrasonic waves would be too high for impact measurement because at this high sampling rate a very large number of samples will be needed to cover a few cycles of an audible signal, which is not only unnecessary but also very demanding in terms of storage capability and calculation power of the electronics. In order to use one single acoustic mill monitoring apparatus to effectively handle both ultrasound signals and audible signals, the following method may be employed. First of all, for active wear measurement, a trigger signal at a repetition frequency of 100 Hz to 500 Hz is used to trigger the excitation of ultrasonic waves in a rod and use the same trigger signal to trigger the digitizer to acquire the ultrasonic echo signal from the rod at a high sampling rate (for example, 80 MHz). A large number of acquired ultrasonic signal traces is averaged to improve the signal to noise ratio and then the averaged signal is used for determination of wear. For passive impact monitoring, the trigger signal is sent at a much higher repetition frequency, for example 100 kHz, and the trigger signal is used to trigger the digitizer to acquire only one sample point of the impact signal but without triggering the high voltage excitation pulse to the transducer. Therefore, the trigger frequency (100 kHz) becomes the sampling frequency of the audible impact noise signal instead of the 80 MHz of the digitizer. This approach can be realized through proper hardware, firmware and software designs of the apparatus.

Figure 18:
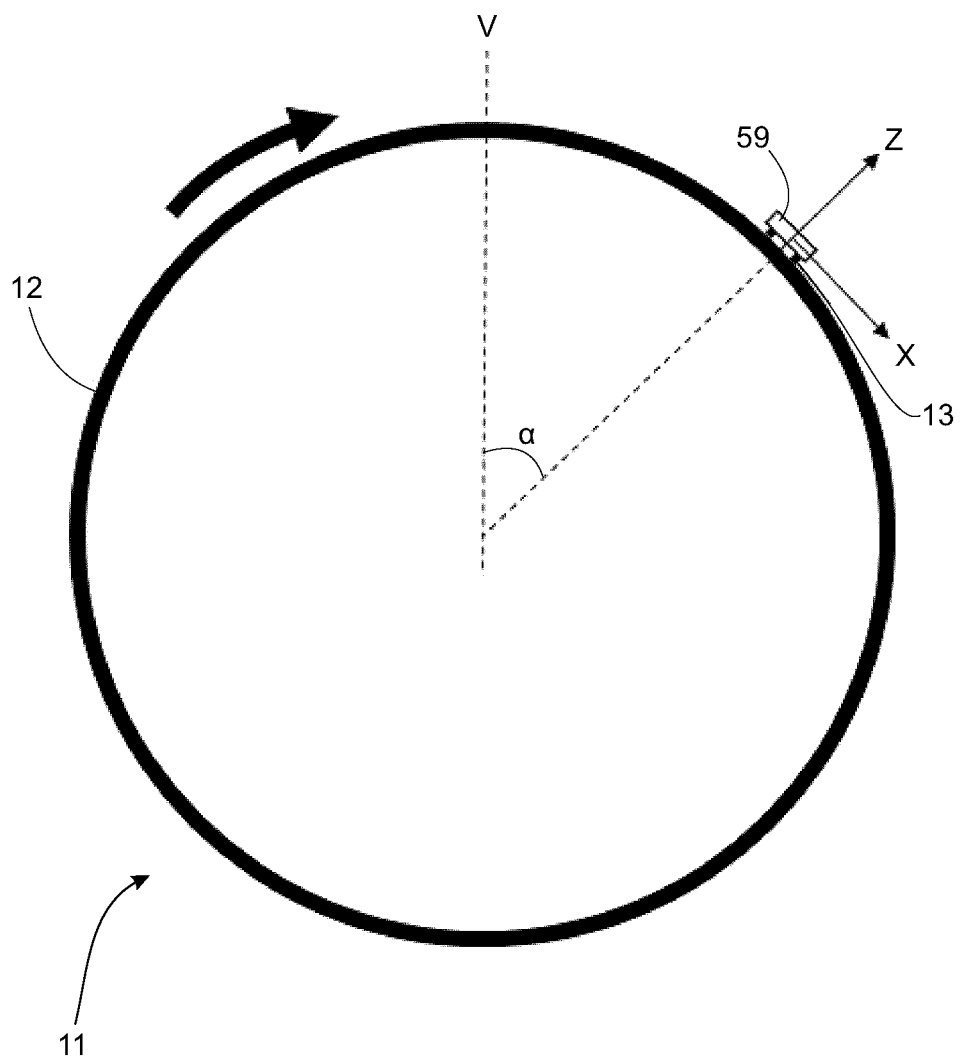
FIG. 18 depicts a tumbling mill with a mill monitoring apparatus mounted on a shell thereof.

As seen in FIG. 18, in implementation, a mill monitoring apparatus 59 may be affixed to a shell 12 of a tumbling mill 11 and rotates with the shell 12. The mill monitoring apparatus 59 comprises a means for determining its angular position α. And this angular position α is used as a reference for determining angular positions of wear/impact sensors with respect to a vertical line V (0°) when an impact signal is being recorded. While the means for determining the angular position of the mill monitoring apparatus 59 could be a tilt sensor, an accelerator or a gyroscope, a 3-axis accelerometer capable of measuring both dynamic acceleration resulting from motion or shock and static acceleration, such as gravity, is a good choice. In mounting, the mill monitoring apparatus 59 is positioned in such a way that the Z-axis Z of the accelerometer inside the mill monitoring apparatus 59 points to the direction perpendicular to the surface of the shell 12 and the X-axis X of the accelerometer points to the rotation direction (big arrow) of the mill 11. By monitoring the angular position of the mill monitoring apparatus 59, rotation speed of the mill 11 vs. angular position of the mill monitoring apparatus 59 can also be determined and used as an indicator of mill operation and health condition. The mill monitoring apparatus 59 could be affixed to a feed head or a discharge head of the mill 11, if deemed practical. To reduce adverse effects of high temperature of the tumbling mill 11 to the electronics as well as interference from impact induced vibration on accelerometer angle measurement, the mill monitoring apparatus 59 is thermally and acoustically insulated from the shell 12 of the tumbling mill 11 with thermal insulation and vibration absorption pads 13.

The mill monitoring apparatus can monitor a plurality of locations through multiplexing. For example, with a 16-channel apparatus, four cross-sections at different locations in the flow direction of ore can be monitored. At each cross-section, 4 probes can be installed at 90° apart from each other. By using 4 probes in one cross-section, impact noise can be measured with any of the 4 probes passing under the impact region, therefore increasing the chance of metal-to-metal impact being detected. Multiple location wear and impact monitoring in the same cross-section may also provide early detection of unbalanced load or uneven wear in the circumferential direction. A 4-by-4 probe arrangement allows for the above measurements in four cross-sections. The number of available channels and arrangement of probe locations can be adjusted according to the specific needs of production. Data recorded during multiple revolutions of the mill and from different locations can be used jointly to provide more reliable and more profound insight into the health and operation conditions of the mill than a small set of measurements from a single sensor.

An electric power source is important to continuous operation of the mill monitoring apparatus. Unless the mill monitoring apparatus is energy sufficient during the entire monitoring period (depending on energy consumption, battery capacity, length of intended monitoring period, and environmental temperature), there will be need to supply energy from an outside energy source to the apparatus to sustain its operation. Power supply through an electrical cable to the apparatus on a rotating shell is not trivial. There are a variety of ways to harvest energy from a rotating mill, but there seem to be no commercial products that are robust, practical, cost-competitive and efficient enough to harvest the energy needed.

Figure 19A:
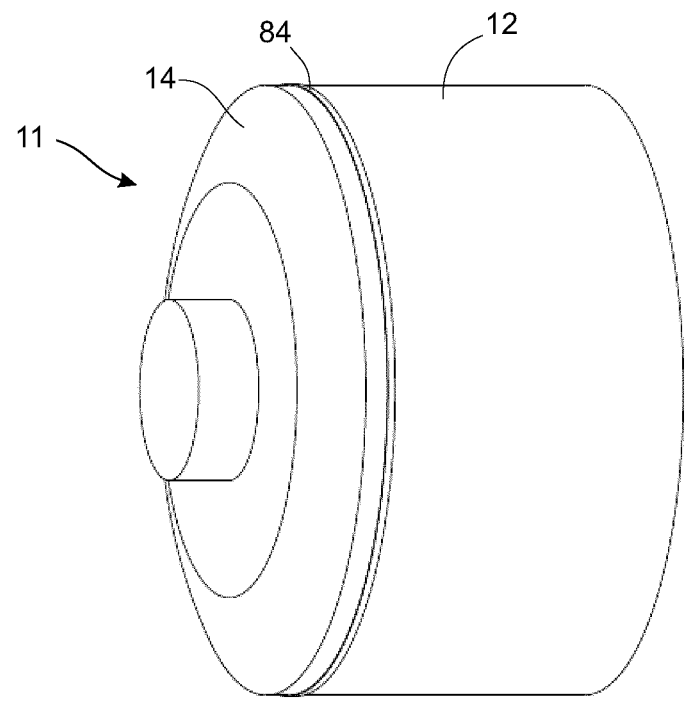
FIG. 19A depicts a schematic diagram of a tumbling mill equipped with a strip of solar cells for supplying electric power to a mill monitoring apparatus.
Figure 19B:
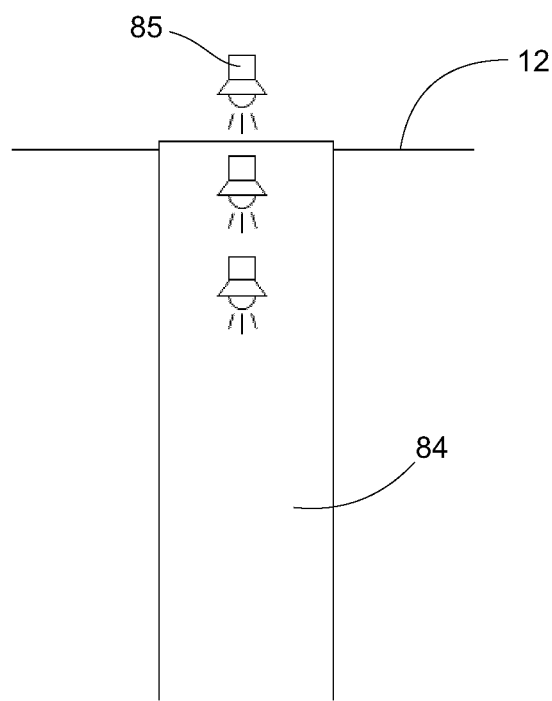
FIG. 19B depicts a magnified view of the strip of solar cells depicted in FIG. 19A in association with artificial lights.
Figure 20B:
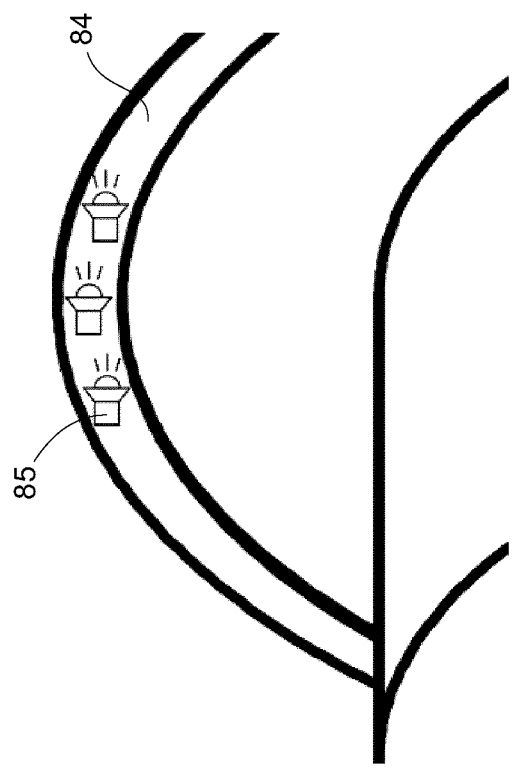
FIG. 20B depicts a magnified view of the ring of solar cells depicted in FIG. 20A in association with artificial lights.
Figure 20A:
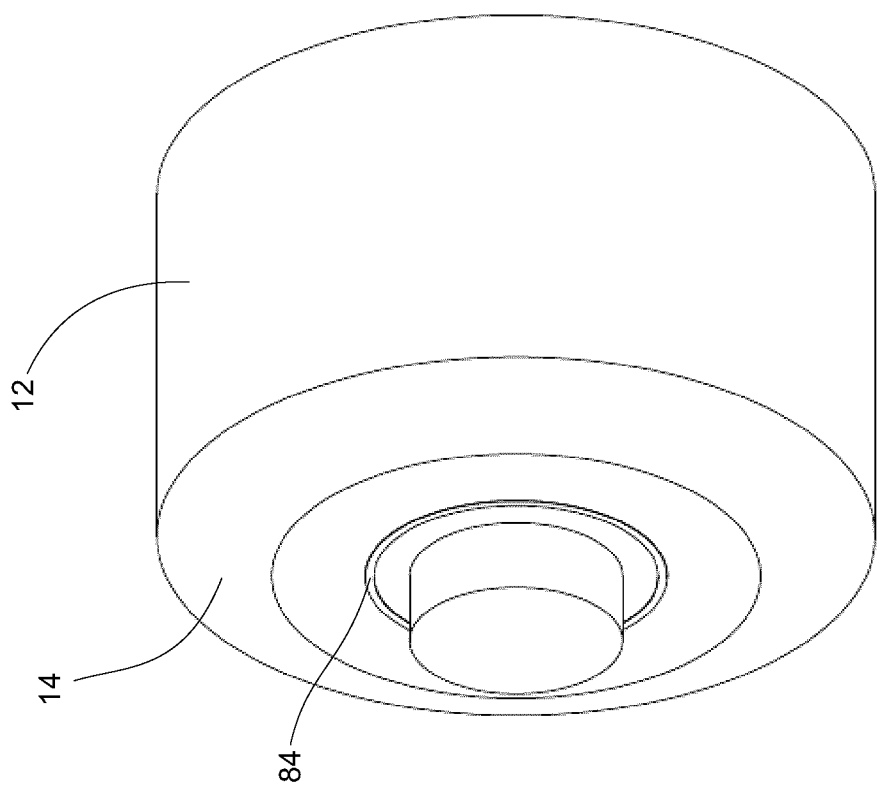
FIG. 20A depicts a schematic diagram of a tumbling mill equipped with a ring of solar cells for supplying electric power to a mill monitoring apparatus.

In one embodiment of an alternative solution as illustrated in FIG. 19A and FIG. 19B, a strip of flexible solar cells 84 is installed around the shell 12 of the tumbling mill 11, the mill 11 having a feed head 14 and a discharge head (not shown) on opposite faces of the shell 12. Artificial lights 85 (only one labeled) are used to irradiate the strip of flexible solar cells 84 to generate electricity. The electricity thus generated is used to power the mill monitoring apparatus. Depending on the electrical power needed, the number of artificial lights 85 can be adjusted to provide enough electricity. When it is time to measure liner wear or charge impact, the lights 85 are switched on. When the measurement is over, the lights 85 are switched off. According to the present state of the art, a combination of monocrystalline silicon cells and incandescent light would provide the highest energy output compared with combinations of other types of photovoltaic cells and artificial light, and therefore a choice of power supply for the mill monitoring apparatus. As well, spotlight type incandescent bulbs are preferred due to the capability to direct produced light to energy cells. Alternatively, as illustrated in FIG. 20A and FIG. 20B, the strip of flexible solar cells 84 can be installed as a ring on the feed head 14 or the discharge head (not shown) of the shell 12 of the mill, if deemed practical.

In addition to monitoring wear and impact on liners within the shell, the invention applies to monitoring wear and impact on liners inside feed head and discharge head as well.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A method of monitoring both liner wear and charge impact in a mill comprising:
deploying a sensing probe through an opening in a shell of a mill into a liner of the shell, the sensing probe comprising a sensor and an elongated element having a proximal end and a distal end, the sensor mounted on the proximal end of the elongated element outside the shell, the distal end of the elongated element situated inside the liner inside the shell so that the distal end of the elongated element is impacted by charge during operation of the mill, the elongated element wearing at a same rate as the liner under conditions within the shell, the sensor capable of detecting impact of the charge on the elongated element during operation of the mill;
using the sensor to determine whether the elongated element has decreased in length since a previous length determination and relating a decrease in the length of the elongated element to liner wear; and,
using the sensor to determine variations in charge impact on the elongated element over time and relating the variations in charge impact over time to a force of impact events in the mill and/or a location of the charge in the mill.

2. The method of claim 1, wherein using the sensor comprises, during the operation of the mill, continuously detecting vibrations of the elongated element caused by the impact of charge on the elongated element in the mill, and determining the variations in charge impact on the elongated element over time from variations in amplitude of the vibrations over time to determine the force of the impact events in the mill and/or the location of the charge in the mill.

3. The method of claim 1, wherein the location of the charge in the mill is determined from a 360-degree real-time charge impact polar plot provided by the sensor.

4. The method of claim 1, wherein using the sensor comprises detecting at least one structural resonant frequency of the elongated element caused by impact of charge on the elongated element in the mill, determining from the at least one structural resonant frequency whether the at least one structural resonant frequency has increased since a previous structural resonant frequency determination, and determining the decrease in the length of the elongated element from an increase in the at least one structural resonant frequency.

5. The method of claim 1, wherein the sensor is an ultrasound sensor and using the sensor comprises, with the ultrasound sensor in active mode,
propagating an ultrasound wave to the distal end of the elongated element,
determining round-trip travel time of the ultrasound wave between the ultrasound sensor and the distal end,
determining whether the travel time has decreased since a previous travel time determination, and
determining the decrease in the length of the elongated element from a decrease in the travel time.

6. The method of claim 5, wherein the sensor is an ultrasound sensor comprising a shear wave ultrasound transducer.

7. The method of claim 6, wherein the shear wave ultrasound transducer comprises a piezoelectric transducer that generates acoustic waves of higher frequencies than frequencies of vibrations and acoustic waves caused by the impact of the charge on the elongated element.

8. A method of monitoring liner wear in a mill, the method comprising:
propagating shear ultrasound waves in the elongated element to a distal end of an elongated element, the elongated element deployed through an opening in a shell of a mill into a liner of the shell so that the distal end of the elongated element is impacted by charge during operation of the mill, the elongated element wearing at a same rate as the liner under conditions within the shell;
determining travel time of the shear ultrasound waves to the distal end;
determining whether the travel time has decreased since a previous travel time determination;
determining a decrease in length of the elongated element from a decrease in the travel time of the ultrasound waves to the distal end; and,
relating the decrease in the length of the elongated element to liner wear.

9. The method of claim 8, wherein an ultrasound sensor is mounted on the elongated element, the ultrasound sensor propagating the shear ultrasound waves in the elongated element, and the travel time of the shear ultrasound waves is determined by detecting the arrival at the ultrasound sensor of an echo signal of the shear ultrasound waves that was propagated to the distal end of the elongated element.

10. The method of claim 9, wherein: the distal end of the elongated element has an uneven wear profile.

11. The method of claim 10, wherein the travel time of the shear ultrasound waves to the distal end is determined for a longest distance and at least one other distance shorter than the longest distance from a proximal end of the elongated element to the distal end of the elongated element.

12. The method of claim 11, wherein the echo signal comprises a combined echo signal comprising an echo signal from a most extreme end of the distal end and at least one other echo signal from an acoustic reference marker on a side of the elongated element at a known distance from the proximal end, the longest distance determined by detecting the echo signal from the most extreme end and the at least one other distance determined by detecting the at least one other echo signal.

13. The method of claim 12, wherein:
a change in travel time of the at least one other echo signal due to a temperature change is used to correct the determination of all of the distances for effects of the temperature change; and/or,
subtraction between a current combined echo signal and an earlier combined signal acquired at a temperature close to a current temperature is conducted to make the echo signal from the most extreme end of the wear face more discernable to provide a more accurate determination of the longest distance.

14. The method of claim 12, wherein the acoustic reference marker is one of a plurality of longitudinally spaced-apart reference notches inscribed along one or more sides of the elongated element.

15. The method of claim 10, wherein a difference between the longest distance and the at least one other distance is used to determine the wear profile at the distal end of the elongated element.

16. A method of monitoring liner wear in a mill comprising:
providing acoustic markers on a liner bolt that affixes a liner to a shell of the mill, the liner bolt having a distal end that is impacted by charge during operation of the mill and wears at a same rate as the liner under conditions within the shell;
propagating shear, longitudinal or another type of ultrasound waves in the liner bolt;
tracking echo signals reflected off an extreme end of a wear face of the liner bolt at the distal end of the liner bolt and off a current distalmost acoustic marker;
determining travel time of the ultrasound waves to the extreme end of the wear face, and determining a decrease in travel time to the extreme end of the wear face in comparison to a previous travel time determination of the ultrasound waves to the extreme end of the wear face;
determining a decrease in length of the liner bolt from the decrease in the travel time of the ultrasound waves to the extreme end of the wear face; and,
relating the decrease in the length of the liner bolt to liner wear by
determining when a waveform of the echo signal reflected off the current distalmost acoustic marker starts to change due to a change in shape of the current distalmost acoustic marker caused by wear of the liner bolt,
determining travel time of the ultrasound waves to the current distalmost acoustic marker,
determining distances from a proximal end of the liner bolt to the extreme end of the wear face and to the current distalmost acoustic marker,
determining liner wear profile from a difference between the distance from the proximal end of the liner bolt to the extreme end of the wear face and the distance from the proximal end of the liner bolt to the current distalmost acoustic marker, estimating actual liner wear profile from the determined liner wear profile until a next distalmost acoustic marker is reached due to wear of the liner bolt, updating liner wear profile information each time the liner bolt wears down to one of the acoustic markers as indicated by a change to the waveform of the echo signal.

17. An apparatus for monitoring tumbling mill condition and tumbling mill operation condition comprising:

means for acquiring ultrasonic waves for rod wear measurement and audible sound waves for detection and measurement of charge impact with a same data acquisition device;

means for measuring angular position of the tumbling mill at each moment impact data is being recorded;

means for conducting the wear and impact measurements at a plurality of locations; and, means for supplying electric power to the apparatus.

18. The apparatus of claim 17, wherein the means for measuring angular position of the tumbling mill at each moment impact data is being recorded is a 3-axis accelerometer capable of measuring both dynamic acceleration resulting from motion or shock and static acceleration.

19. The apparatus of claim 17, wherein the means for conducting the wear and impact measurements at a plurality of locations applies to a plurality of locations in a same cross-section for improved sensitivity and also for early detection of unbalanced load or uneven wear in the circumferential direction.

20. The apparatus of claim 17, wherein the means for conducting the wear and impact measurements at a plurality of locations applies to a plurality of cross-sections in a flow direction of ore.

21. The apparatus of claim 17, wherein the means for measuring angular position of the tumbling mill is used for monitoring rotation speed of the mill vs angular position of the monitoring apparatus as an indicator of mill operation and health condition.

* * * * *